United States Patent
Benveniste

(10) Patent No.: US 7,664,132 B2
(45) Date of Patent: *Feb. 16, 2010

(54) RANDOM MEDIUM ACCESS METHODS WITH BACKOFF ADAPTATION TO TRAFFIC

(75) Inventor: Mathilde Benveniste, South Orange, NJ (US)

(73) Assignee: AT&T Corp., New York, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/860,323

(22) Filed: Sep. 24, 2007

(65) Prior Publication Data

US 2008/0013567 A1 Jan. 17, 2008

Related U.S. Application Data

(63) Continuation of application No. 11/239,771, filed on Sep. 29, 2005, now Pat. No. 7,274,708, which is a continuation of application No. 10/032,507, filed on Jan. 2, 2002, now Pat. No. 7,027,462, which is a continuation-in-part of application No. 09/985,257, filed on Nov. 2, 2001, now Pat. No. 7,095,754.

(60) Provisional application No. 60/258,885, filed on Jan. 2, 2001, provisional application No. 60/261,165, filed on Jan. 16, 2001, provisional application No. 60/264,727, filed on Jan. 30, 2001, provisional application No. 60/267,439, filed on Feb. 9, 2001, provisional application No. 60/270,862, filed on Feb. 26, 2001, provisional application No. 60/271,731, filed on Feb. 28, 2001, provisional application No. 60/272,786, filed on Mar. 5, 2001.

(51) Int. Cl.
*H04L 12/413* (2006.01)

(52) U.S. Cl. .................. 370/445; 370/338; 370/349

(58) Field of Classification Search .............. None
See application file for complete search history.

(56) References Cited

U.S. PATENT DOCUMENTS 5,142,533 A 8/1992 Crisler et al.

(Continued)

FOREIGN PATENT DOCUMENTS

EP 0994604 A2 4/2000

(Continued)

OTHER PUBLICATIONS

"Amendment—Radio Equipment and Systems (RES); High Performance Radio Local Area Network (HIPERLAN) Type 1; Functional Specification", ETSI, ETS 300 652, May 1997, pp. 1-21.

(Continued)

*Primary Examiner*—Ajit Patel

(57) ABSTRACT

Using low PF values in conjunction with traffic-adapted contention windows leads to substantial decreases in delay and jitter. In general, adaptation to traffic reduces contention or delay: opening up the contention window in congestion and closing it on relief. Residual backoff adaptation provides for the reduction of the already decremented backoff values of stations that interrupted the backoff countdown process due to a transmission. It is good to adapt both the contention window and the residual backoff in order to avoid jitter. Otherwise, if the contention window is reduced but residual backoffs stay unchanged, new arrivals will enjoy shorter backoff delays than older ones, resulting in greater jitter. Adjusting both preserves the relative ordering of backoff counter values, which implies also some form of age ordering. Different adjustments can be applied to different priority traffic.

16 Claims, 11 Drawing Sheets

U.S. PATENT DOCUMENTS

| | | | |
|---|---|---|---|
| 5,185,739 | A | 2/1993 | Spear |
| 5,297,143 | A | 3/1994 | Fridrich et al. |
| 5,329,531 | A | 7/1994 | Diepstraten et al. |
| 5,353,287 | A | 10/1994 | Kuddes et al. |
| 5,355,375 | A | 10/1994 | Christensen |
| 5,416,780 | A | 5/1995 | Patel |
| 5,636,223 | A | 6/1997 | Reardon et al. |
| 5,644,576 | A | 7/1997 | Bauchot et al. |
| 5,682,381 | A | 10/1997 | Sekihata et al. |
| 5,742,592 | A | 4/1998 | Scholefield et al. |
| 5,828,663 | A | 10/1998 | Ikegami |
| 5,852,405 | A | 12/1998 | Yoneda et al. |
| 5,852,723 | A | 12/1998 | Kalkunte et al. |
| 5,892,769 | A | 4/1999 | Lee |
| 5,987,033 | A | 11/1999 | Boer et al. |
| 5,999,818 | A | 12/1999 | Gilbert et al. |
| 6,055,578 | A | 4/2000 | Williams et al. |
| 6,067,291 | A | 5/2000 | Kamerman et al. |
| 6,078,591 | A | 6/2000 | Kalkunte |
| 6,343,071 | B1 | 1/2002 | Lansford |
| 6,473,414 | B1 | 10/2002 | Hartley et al. |
| 6,563,790 | B1 * | 5/2003 | Yu et al. ............ 370/230 |
| 6,674,765 | B1 | 1/2004 | Chuah et al. |
| 7,095,754 | B2 | 8/2006 | Benveniste |
| 2002/0061031 | A1 | 5/2002 | Sugar et al. |
| 2002/0152324 | A1 | 10/2002 | Sherman |
| 2003/0103521 | A1 * | 6/2003 | Raphaeli et al. ......... 370/445 |
| 2007/0019664 | A1 | 1/2007 | Benveniste |
| 2007/0019665 | A1 | 1/2007 | Benveniste |
| 2007/0038752 | A1 * | 2/2007 | Jorgensen ............ 709/226 |
| 2007/0110087 | A1 | 5/2007 | Abel et al. |

FOREIGN PATENT DOCUMENTS

WO    WO 03-039054 A2    5/2003

OTHER PUBLICATIONS

"Broadband Radio Access Network (BRAN); HIPERLAN type 2; System Overview", ETSI, ETSI TR 101 683 VI.1.1 (Feb. 2000), Technical Report, pp. 1-19.

"Broadband Radio Access Networks (BRAN); HIPERLAN Type 2; Data Link Control (DLC) Layer; Part 4: Extension for Home Environment" ETSI, ETSI TS 101 761-4 VI.2.1. (Dec. 2000), pp. 1-125.

Diepstraten, "Wireless Access Method and Physical Specification", IEEE, IEEE P802.11-93/70, May 1993, pp. 1-16 slides 1-6.

White, "Wireless Access Method and Physical Layer Specifications", IEEE, IEEE P802.11-93/159, Sep. 1993, pp. 1-8.

Diepstraten et al. Wireless Access Method and Physical Specification, IEEE, IEEE O802.11-94/150, Jul. 1994, pp. 1-12, Slides 1-11 & 1-23.

Andrew S. Tanenbaum, *Computer Networks*, 3ed, 1996 Prentice Hall, Chapter 4, "The Medium Access Sublayer", PP. 243-338.

James L. Massey, Collision-Resolution Algorithms and Random-Access Communications, Multi-User Communication Systems, edited by G. Long, Universita' di Trieste, 1981 by CISM, Udine, pp. 73-137.

Leonard Kleinrock et al., "Packet Switching in Radio Channels: Part I—Carrier Sense Multiple-Access Modes and Their Throughput-Delay Characteristics," IEEE Transactions on Communications, vol. Com-23, No. 12, Dec. 1975, pp. 1400-1416.

Ronald L. Rivest, "Network Control by Bayesian Broadcast," IEEE Transaction on Information Theory, vol. IT-33, May 1987, pp. 323-328.

Phil Karn, "MACA—A New Channel Access Method for Packet Radio," 9th Computer Networking Conference, ARRL/CRRL Amateur Radio, 1990, pp. 134-140.

Vaduvur Bharghavan et al., "MACAU: A Media Access Protocol for Wireless LAN's", Computer Communication Review, vol. 24, No. 4, Oct. 1994, pp. 212-225.

The Bluetooth Special Interest group, Specification of Bluetooth System, Version 1.1, Feb. 22, 2001, pp. 41-47.

IEEE Std. 802.11, "Local and Metropolitan Area Networks", 1997, p. 92.

Bononi, L., et al. "Design and Performance Evaluation of an Asymptotically Optimal Backoff Algorithm for IEEE 802.11 Wireless LANs", Proceeding of the 33rd Hawaii International Conference on System Sciences—2000, Jan. 4-7, 2000, pp. 1-10.

Deng, Dr-Jiunn, et al. "A Priority Scheme for IEEE 802.11 DCF Access Method", IEICE Trans. Communication, Jan. 1999, vol. E82-B, No. 1.

* cited by examiner

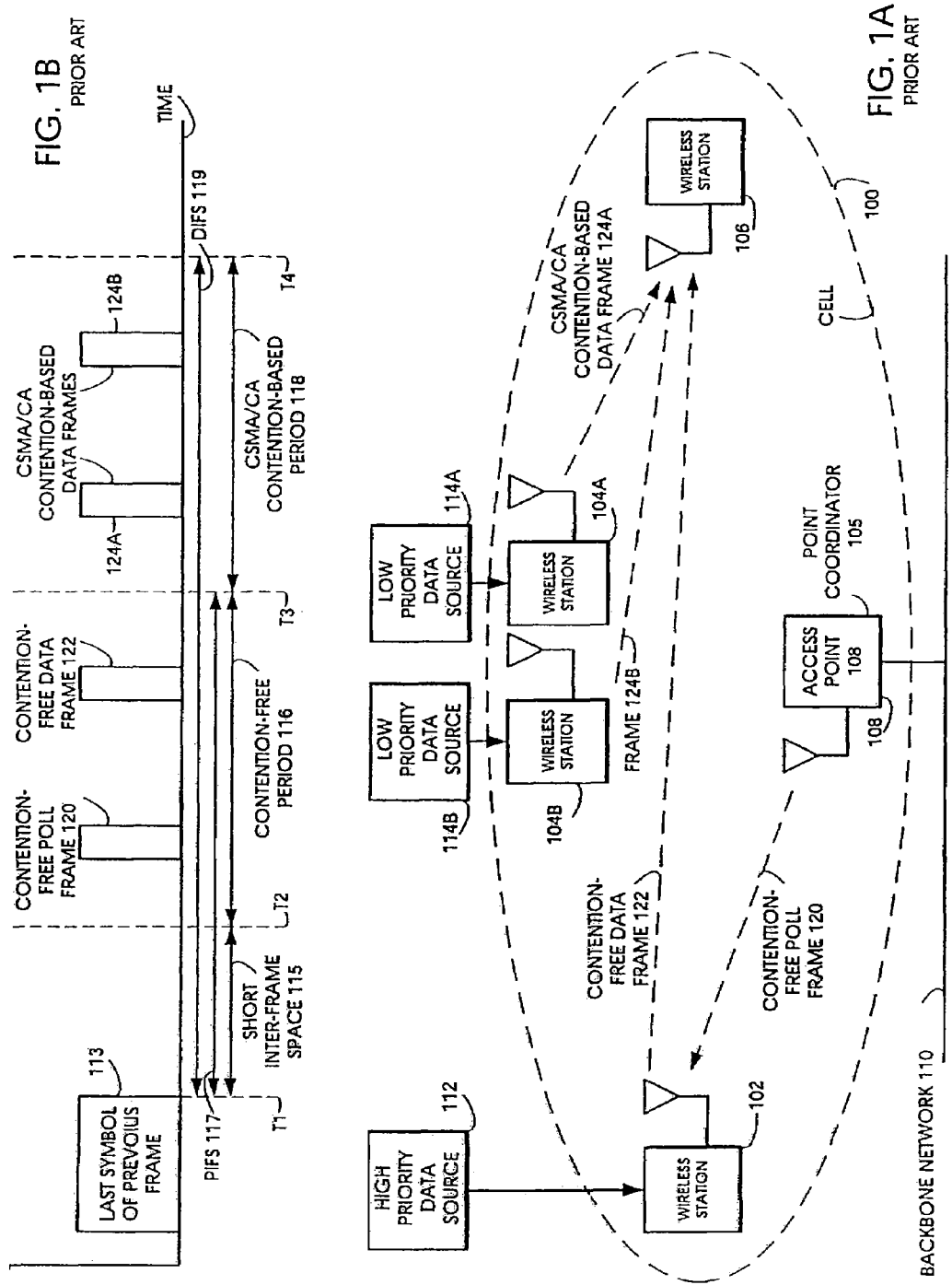

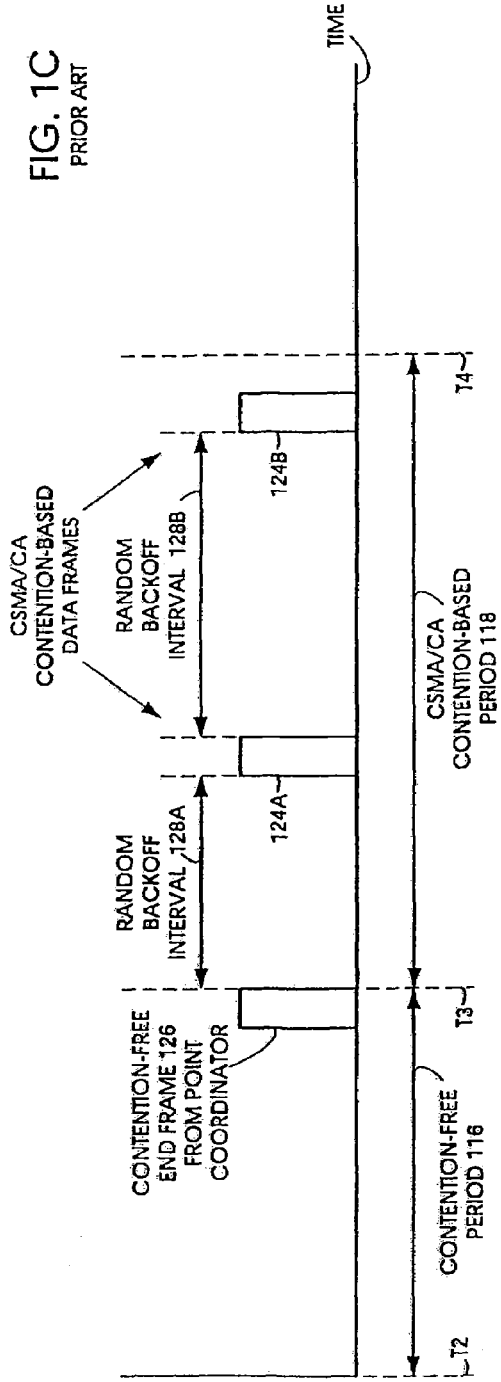
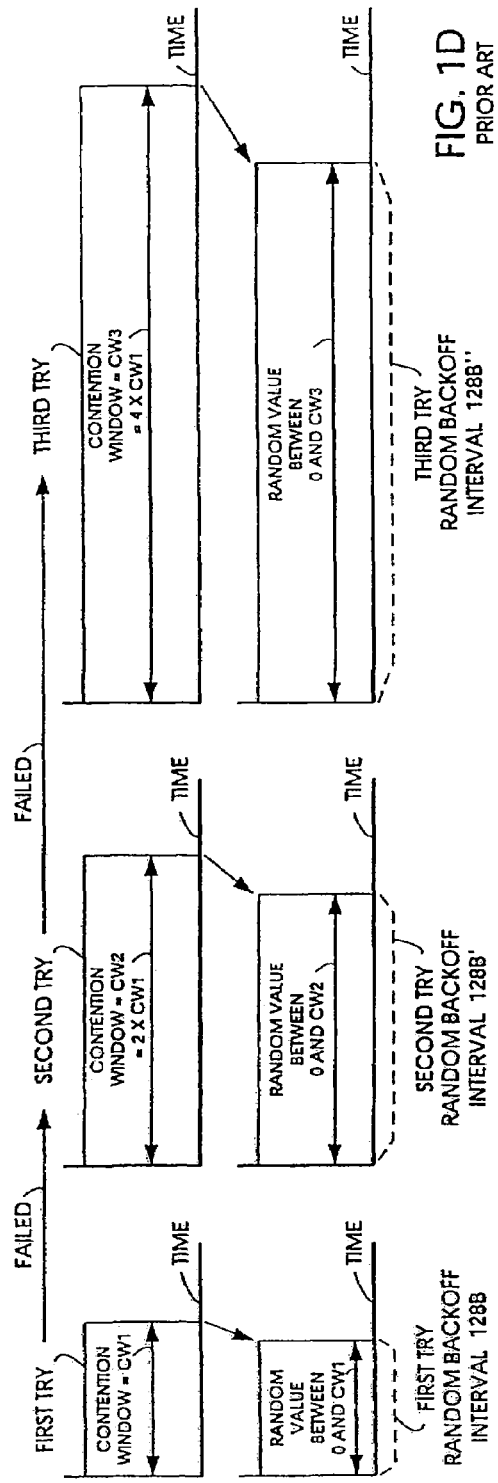
FIG. 1C PRIOR ART
FIG. 1D PRIOR ART

FIG. 4

CONGESTION IS ESTIMATED FOR EACH URGENCY CLASS THROUGH THE INTRODUCTION OF NEW FIELD IN ALL RESERVATION MESSAGES [INCLUDING REQUEST TO SEND (RTS) AND CLEAR TO SEND (CTS)] AND HEADERS OF TRANSMITTED PACKETS INDICATING THE NUMBER OF TRANSMISSION ATTEMPTS

| RESERVATION MESSAGES [INCLUDING REQUEST TO SEND (RTS) AND CLEAR TO SEND (CTS)] AND HEADERS OF TRANSMITTED PACKETS | FEEDBACK ON THE SUCCESS OR FAILURE OF A TRANSMISSION ATTEMPT | THE NUMBER OF RE-TRANSMISSIONS ATTEMPTED BY A NODE | THE NUMBER OF RE-TRANSMISSIONS ATTEMPTED BY EACH NEIGHBOR OF A NODE | THE AGE OF SUCH RETRIALS | A SEPARATE NUMBER OF TRANSMISSION ATTEMPTS IS REMEMBERED OR BROADCAST FOR EACH URGENCY CLASS |

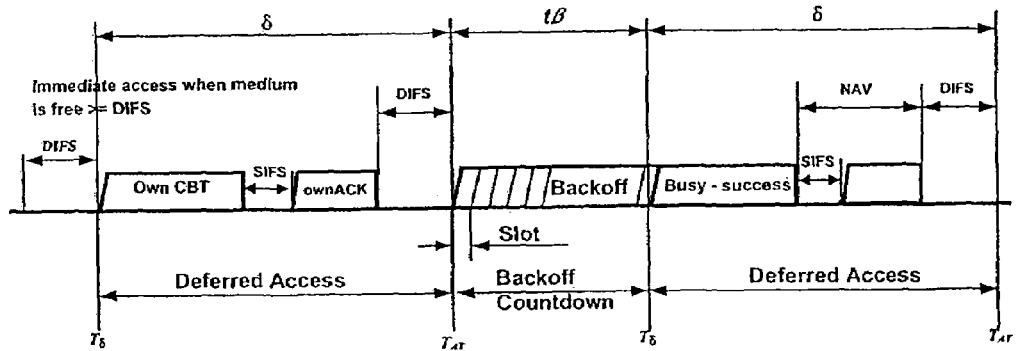
Figure 6— Fast Adaptation timing for own transmission, and good observed transmission
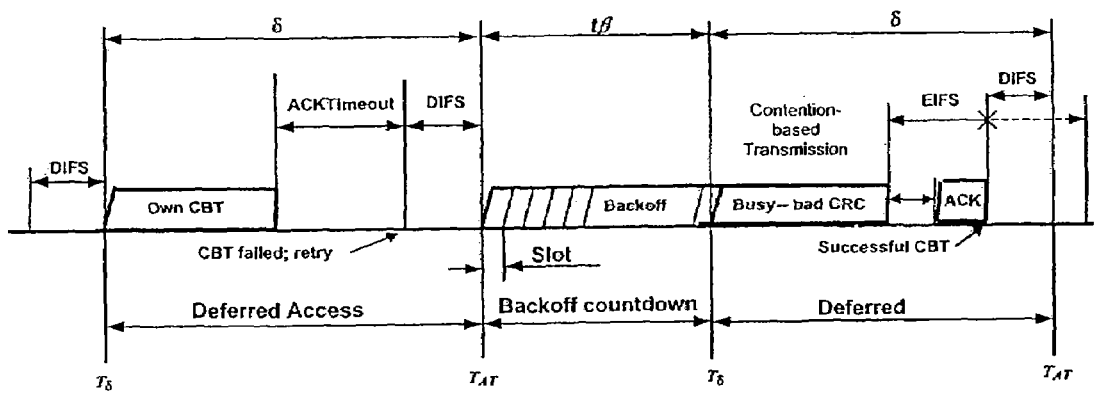
Figure 7— Fast Adaptation timing - ACK Timeout, and recovered observed transmission failure
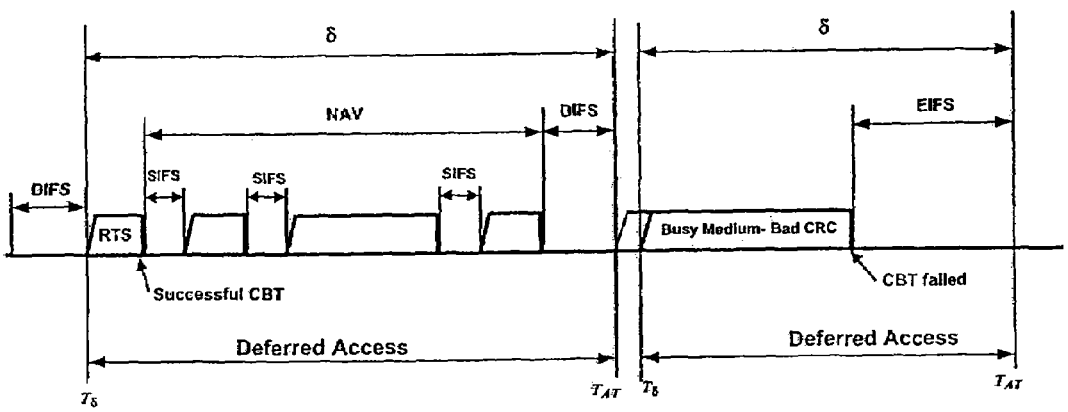
Figure 8— Fast Adaptation timing – Observed successful RTS and observed transmission failure

RANDOM MEDIUM ACCESS METHODS WITH BACKOFF ADAPTATION TO TRAFFIC

CROSS REFERENCE TO RELATED APPLICATIONS

This application is a continuation of U.S. Ser. No. 11/239,771, filed Sep. 29, 2005, now U.S. Pat. No. 7,274,708 entitled RANDOM MEDIUM ACCESS METHODS WITH BACKOFF ADAPTATION TO TRAFFIC (currently allowed), which is a continuation of U.S. Ser. No. 10/032,507 filed on Jan. 2, 2002, (now issued as U.S. Pat. No. 7,027,462), entitled RANDOM MEDIUM ACCESS METHODS WITH BACKOFF ADAPTATION TO TRAFFIC, which is a continuation-in-part of U.S. Ser. No. 09/985,257, filed Nov. 2, 2001, (now issued as U.S. Pat. No. 7,095,754), entitled, "TIERED CONTENTION MULTIPLE ACCESS (TCMAS): A METHOD FOR PRIORITY-BASED SHARED CHANNEL ACCESS," which claims the benefit of the following provisional patent applications: U.S. Provisional Ser. No. 60/258,885, filed Jan. 2, 2001, entitled "BACKOFF WITH FAST ADAPTATION TO TRAFFIC"; U.S. Provisional Ser. No. 60/261,165, filed Jan. 16, 2001, entitled "IMPROVED BACKOFF WITH FAST ADAPTATION TO TRAFFIC"; U.S. Provisional Ser. No. 60/264,727, filed Jan. 30, 2001, entitled, "BACKOFF WITH FAST ADAPTATION TO TRAFFIC"; U.S. Provisional Ser. No. 60/267,439, filed Feb. 9, 2001, entitled, "BACKOFF WITH FAST ADAPTATION TO TRAFFIC"; U.S. Provisional Ser. No. 60/270,862, filed Feb. 26, 2001, entitled, "BACKOFF WITH FAST ADAPTATION USING ESTIMATES OF THE NUMBER OF BACKLOGGED STATIONS"; U.S. Provisional Ser. No. 60/271,731, filed Feb. 28, 2001, entitled, "BACKOFF WITH FAST ADAPTATION USING ESTIMATES OF THE NUMBER OF BACKLOGGED STATIONS" and U.S. Provisional Ser. No. 60/272,786, filed Mar. 5, 2001, entitled, "IMPROVED BACKOFF WITH FAST ADAPTATION TO TRAFFIC," all of which are incorporated herein by reference.

FIELD OF THE INVENTION

The invention disclosed broadly relates to telecommunications methods and more particularly relates to collision avoidance in multiple access networks. A method for backoff adaptation to traffic fluctuations is proposed for the backoff approach to collision avoidance/contention resolution. The proposed method enables the backoff approach to maintain low latency jitter. The adaptation procedure is generalized to include contention-based reservation systems and contention-based media access systems sharing a channel with non-contention systems.

BACKGROUND OF THE INVENTION

Wireless Local Area Networks (WLANS)

Wireless local area networks (WLANs) generally operate at peak speeds of between 10 to 100 Mbps and have a typical range of 100 meters. Single-cell Wireless LANs, as shown in FIG. 1A, are suitable for small single-floor offices or stores. A station in a wireless LAN can be a personal computer, a bar code scanner, or other mobile or stationary device that uses a wireless network interface card (NIC) to make the connection over the RF link to other stations in the network. The single-cell wireless LAN 100 of FIG. 1A provides connectivity within radio range between wireless stations 102, 104A, 104B, 106, and 108. Access point 108 allows connections via the backbone network 110 to wired network-based resources, such as servers. A single-cell wireless LAN can typically support up to 25 users and still keep network access delays at an acceptable level. Multiple-cell wireless LANs provide greater range than does a single-cell, by means of a set of access points and a wired network backbone to interconnect a plurality of single-cell LANs. Multiple-cell wireless LANs can cover larger multiple-floor buildings. A mobile laptop computer or data collector with a wireless network interface card (NIC) can roam within the coverage area while maintaining a live connection to the backbone network 11.

Wireless LAN specifications and standards include the IEEE 802.11 Wireless LAN Standard and the HIPERLAN Type 1 and Type 2 Standards. The IEEE 802.11 Wireless LAN Standard is published in three parts as *IEEE 802.11-1999; IEEE 802.11a-1999; and IEEE 802.11b-1999*, which are available from the IEEE, Inc. web site http://grouper.ieee.org/groups/802/11. An overview of the HIPERLAN Type 1 principles of operation is provided in the publication *HIPERLAN Type 1 Standard*, ETSI ETS 300 652, WA2 December 1997. An overview of the HIPERLAN Type 2 principles of operation is provided in the Broadband Radio Access Networks (BRAN), *HIPERLAN Type 2; System Overview*, ETSI TR 101 683 VI.I.1 (2000-02) and a more detailed specification of its network architecture is described in *HIPERLAN Type 2, Data Link Control (DLC) Layer; Part 4. Extension for Home Environment*, ETSI TS 101 761-4 V1.2.1 (2000-12). A subset of wireless LANs is Wireless Personal Area Networks (PANs), of which the Bluetooth Standard is the best known. The Bluetooth Special Interest Group, *Specification Of The Bluetooth System*, Version 1.1, Feb. 22, 2001, describes the principles of Bluetooth device operation and communication protocols.

The IEEE 802.11 Wireless LAN Standard defines at least two different physical (PHY) specifications and one common medium access control (MAC) specification. The IEEE 802.11(a) Standard is designed to operate in unlicensed portions of the radio spectrum, usually either in the 2.4 GHz Industrial, Scientific, and Medical (ISM) band or the 5 GHz Unlicensed-National Information Infrastructure (U-NII) band. It uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can also have an independent configuration where the mobile stations communicate directly with one another, without support from a fixed access point.

A single-cell wireless LAN using the IEEE 802.11 Wireless LAN Standard is an Independent Basic Service Set (IBSS) network. An IBSS has an optional backbone network and consists of at least two wireless stations, as shown in FIG. 1A. A multiple-cell wireless LAN using the IEEE 802.11 Wireless LAN Standard is an Extended Service Set (ESS) network. An ESS satisfies the needs of large coverage networks of arbitrary size and complexity.

Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the Physical Layer for transmission.

Before transmitting a frame, the MAC layer must first gain access to the network. FIG. 1B shows three interframe space (IFS) intervals that defer an IEEE 802.11 station's access to the medium and provide various levels of priority. Each interval defines the duration between the end of the last symbol of the previous frame 113 at time T1, to the beginning of the first symbol of the next frame. The Short Interframe Space (SIFS) 115 provides the highest priority level by allowing some frames to access the medium before others, such as an Acknowledgement (ACK) frame, a Clear to Send (CTS) frame, or a subsequent fragment burst of a previous data frame. These frames require expedited access to the network to minimize frame retransmissions.

The Priority Interframe Space (PIFS) 117 of FIG. 1B is used for high priority access to the medium during the contention-free period 116 starting at T2 and ending at T3. The point coordinator 105 in the access point 108 connected to backbone network 110 in FIG. 1A controls the priority-based Point Coordination Function (PCF) to dictate which stations in cell 100 can gain access to the medium. During the contention-free period 116, station 102 in FIG. 1A, for example, is directed by the access point 108 to transmit its high priority data frame 122. The point coordinator 105 in the access point 108 sends a contention-free poll frame 120 to station 102, granting station 102 permission to transmit a single frame to any destination. Station 102 wants to transmit its high priority data frame 122 to the receiving station 106. Station 102 can transmit its frame 122 during period 116 if it senses that the medium is idle. All other stations, such as stations 104A, 104B, and 106, in the cell 100 can only transmit during contention-free period 116 if the point coordinator grants them access to the medium. In this example, stations 104A and 104B have low priority data sources 114A and 114B, and thus they must wait until the end of the contention-free period 116 at T3. This is signaled by the contention-free end frame 126 sent by the point coordinator in FIG. 1C. The contention-free end frame 126 is sent to identify the end of the contention-free period 116, which occurs when time expires or when the point coordinator has no further frames to transmit and no stations to poll.

The distributed coordination function (DCF) Interframe Space (DIFS) 119 of FIG. 1B is used by stations 104A and 104B, for example, for transmitting low priority data frames 124A and 124B, respectively, during the contention-based period 118. The DIFS spacing delays the transmission of lower priority frames 124A and 124B to occur between T3 and T4, later than the priority-based transmission of frame 122 sent by station 102. An Extended Interframe Space (EIFS) (not shown) goes beyond the time of a DIFS interval as a waiting period when a bad reception occurs. The EIFS interval provides enough time for the receiving station to send an acknowledgment (ACK) frame.

During the contention-based period 118, the distributed coordination function (DCF) uses the Carrier-Sense Multiple Access With Collision Avoidance (CSMA/CA) contention-based protocol, which is similar to IEEE 802.3 Ethernet. The CSMA/CA protocol minimizes the chance of collisions between stations sharing the medium by waiting a random backoff interval 128A or 128B of FIG. 1C, if the station's sensing mechanism indicates a busy medium. The period of time immediately following traffic on the medium is when the highest probability of collisions occurs, especially where there is high utilization. For example, stations 102, 104B, and 106 may be waiting for the medium to become idle while station 104A is transmitting, and stations 102, 104B, and 106 will attempt to transmit at the same time, once station 104A stops. Once the medium is idle, CSMA/CA protocol causes each station to delay its transmission by a random backoff time. For example, station 104B delays its transmission by a random backoff time 128B, which defers station 104B from transmitting its frame 124B, thereby minimizing the chance it will collide with those from other stations 102 and 106.

As shown in FIG. 1D, the CSMA/CA protocol computes the random backoff time 128B of station 104B as the product of a constant, the slot time, times a pseudo-random number RN which has a range of values from zero to a collision window CW. The value of the collision window for the first try to access the network by station 104B is CW1+, which yields the first try random backoff time 128B. If the first try to access the network by station 104B fails, then the CSMA/CA protocol computes a new CW by doubling the current value of CW as CW2=CW1 times 2. As shown in FIG. 1D, the value of the collision window for the second try to access the network by station 104B is CW2, which yields the second try random backoff time 128B'. This process by the CSMA/CA protocol of increasing the delay before transmission is called binary exponential backoff. The reason for increasing CW is to minimize collisions and maximize throughput for both low and high network utilization. Stations with low utilization are not forced to wait very long before transmitting their frame. On the first or second attempt, a station will make a successful transmission. However, if the utilization of the network is high, the CSMA/CA protocol delays stations for longer periods to avoid the chance of multiple stations transmitting at the same time. If the second try to access the network by station 104B fails, then the CSMA/CA protocol computes a new CW by doubling again the current value of CW as CW3=CW1 times 4. As shown in FIG. 1D, the value of the collision window for the third try to access the network by station 104B is CW3, which yields the third try random backoff time 128B". The value of CW increases to relatively high values after successive retransmissions, under high traffic loads. This provides greater transmission spacing between stations waiting to transmit.

Collision Avoidance Techniques

Four general collision avoidance approaches have emerged: [1] Carrier Sense Multiple Access (CSMA) [see F. Tobagi and L. Kleinrock, "Packet Switching in Radio Channels: Part I—Carrier Sense Multiple Access Models and their Throughput Delay Characteristics", *IEEE Transactions on Communications*, Vol 23, No 12, Pages 1400-1416, 1975], [2] Multiple Access Collision Avoidance (MACA) [see P. Karn, "MACA—A New Channel Access Protocol for Wireless Ad-Hoc Networks", *Proceedings of the ARRL/CRRL Amateur Radio Ninth Computer Networking Conference*, Pages 134-140, 1990], [3] their combination CSMA/CA, and [4] collision avoidance tree expansion.

CSMA allows access attempts after sensing the channel for activity. Still, simultaneous transmit attempts lead to collisions, thus rendering the protocol unstable at high traffic loads. The protocol also suffers from the hidden terminal problem.

The latter problem was resolved by the MACA protocol, which involves a three-way handshake [P. Karn, supra]. The origin node sends a request to send (RTS) notice of the impending transmission; a response is returned by the destination if the RTS notice is received successfully; and the origin node proceeds with the transmission. This protocol also reduces the average delay as collisions are detected upon transmission of merely a short message, the RTS. With the length of the packet included in the RTS and echoed in the clear to send (CTS) messages, hidden terminals can avoid colliding with the transmitted message. However, this prevents the back-to-back re-transmission in case of unsuccessfully transmitted packets. A five-way handshake MACA protocol provides notification to competing sources of the successful termination of the transmission. [See V. Bharghavan, A. Demers, S. Shenker, and L. Zhang, "MACAW: A media access protocol for wireless LANs", *SIGCOMM '94*, Pages 212-225, ACM, 1994.]

CSMA and MACA are combined in CSMA/CA, which is MACA with carrier sensing, to give better performance at high loads. A four-way handshake is employed in the basic contention-based access protocol used in the Distributed Coordination Function (DCF) of the IEEE 802.11 Standard for Wireless LANs. [See IEEE Standards Department, D3, "Wireless Medium Access Control and Physical Layer WG," *IEEE Draft Standard P802.11 Wireless LAN*, January 1996.]

Collisions can be avoided by splitting the contending terminals before transmission is attempted. In the pseudo-Bayesian control method, each terminal determines whether it has permission to transmit using a random number generator and a permission probability "p" that depends on the estimated backlog. [See R. L. Rivest, "Network control by Bayesian Broadcast", *IEEE Trans. Inform. Theory*, Vol IT 25, pp. 505-515, September 1979.]

To resolve collisions, subsequent transmission attempts are typically staggered randomly in time using the following two approaches: binary tree and binary exponential backoff.

Upon collision, the binary tree method requires the contending nodes to self-partition into two groups with specified probabilities. This process is repeated with each new collision. The order in which contending nodes transmit is determined either by serial or parallel resolution of the tree. [See J. L. Massey, "Collision-resolution algorithms and random-access communications", in *Multi-User Communication Systems*, G. Longo (ed.), CISM Courses and Lectures No. 265, New York: Springer 1982, pp. 73-137.]

In the binary exponential backoff approach, a backoff counter tracks the number of pauses and hence the number of completed transmissions before a node with pending packets attempts to seize the channel. A contending node initializes its backoff counter by drawing a random value, given the backoff window size. Each time the channel is found idle, the backoff counter is decreased and transmission is attempted upon expiration of the backoff counter. The window size is doubled every time a collision occurs, and the backoff countdown starts again. [See A. Tanenbaum, *Computer Networks*, $3^{rd}$ ed., Upper Saddle River, N.J., Prentice Hall, 1996.] The Distributed Coordination Function (DCF) of the IEEE 802.11 Standard for Wireless LANs employs a variant of this contention resolution scheme, a truncated binary exponential backoff, starting at a specified window and allowing up to a maximum backoff range below which transmission is attempted. [IEEE Standards Department, D3, supra] Different backoff counters may be maintained by a contending node for traffic to specific destinations. [Bharghavan, supra]

Quality of Service (QoS)

Quality of service (QoS) is a measure of service quality provided to a customer. The primary measures of QoS are message loss, message delay, and network availability. Voice and video applications have the most rigorous delay and loss requirements. Interactive data applications such as Web browsing have less restrained delay and loss requirements, but they are sensitive to errors. Non-real-time applications such as file transfer, Email, and data backup operate acceptably across a wide range of loss rates and delay. Some applications require a minimum amount of capacity to operate at all, for example, voice and video. Many network providers guarantee specific QoS and capacity levels through the use of Service-Level Agreements (SLAs). An SLA is a contract between an enterprise user and a network provider that specifies the capacity to be provided between points in the network that must be delivered with a specified QoS. If the network provider fails to meet the terms of the SLA, then the user may be entitled to a refund. The SLA is typically offered by network providers for private line, frame relay, ATM, or Internet networks employed by enterprises.

The transmission of time-sensitive and data application traffic over a packet network imposes requirements on the delay or delay jitter and the error rates realized; these parameters are referred to generically as the QoS (Quality of Service) parameters. Prioritized packet scheduling, preferential packet dropping, and bandwidth allocation are among the techniques available at the various nodes of the network, including access points, that enable packets from different applications to be treated differently, helping achieve the different quality of service objectives. Such techniques exist in centralized and distributed variations. The concern herein is with distributed mechanisms for multiple access in cellular packet networks or wireless ad hoc networks.

Backoff Adaptation to Traffic

Two general approaches can be employed for collision avoidance/contention resolution in a contention-based medium access protocol, the backoff approach and the probability approach. The first draws a backoff counter value from a random distribution (typically uniform) which it counts down during idle time slots; transmission is attempted when the counter expires. In the second, transmission is attempted following each idle time slot with a fixed permission probability. The two approaches can be made equivalent from a channel efficiency perspective; provided, of course, their choice of parameters is consistent.

In the pseudo-Bayesian control method, the permission probability "p" used to determine whether a terminal may attempt transmission depends on the estimated backlog. [See R. L. Rivest, "Network control by Bayesian Broadcast", *IEEE Trans. Inform. Theory*, Vol IT 25, pp. 505-515, September 1979.]. Ideally, the window used to draw random backoff delays on the first transmission attempt or retransmission attempt must be appropriate for the traffic intensity and contention level at hand. The residual backoff delays should also be adapted to traffic.

With the capability for a traffic-adapted backoff delay, a different discipline may be used for adjusting the backoff window when transmission fails. While larger backoff windows values may be used initially, if transmission fails, contention persistence is increased by using a "persistence factor" less than 2 to multiply the backoff window upon transmission retrial. This enables decreasing the mean of the statistical distribution from which the new backoff counter would be selected for subsequent attempts. Transmission of newly arrived packets is postponed, thus reducing the competition for the channel and giving a better chance to aging packets to transmit successfully. The overall delay jitter is thus minimized, making this discipline a better choice for isochronous traffic.

Ideally one would want to start with a backoff counter appropriate for the traffic intensity at hand and retry upon failure with successively smaller backoff counters in order to increase the persistence of aging packets. The nodes can estimate traffic intensity from the number of failed transmission attempts, both their own and those of neighboring nodes. For the latter, each node includes the number of the retrial attempts in the messages exchanged during reservation and/or in the packet headers. As each node receives these messages, it will combine them with the retrial attempts it has experienced, assess the level of congestion, and select its initial backoff window accordingly. A shorter backoff counter is needed for lower traffic intensity.

Adaptation to traffic can be pursued for both the parameters of the backoff distribution from which backoff counters are drawn upon transmission attempt or following transmission failure, and for the adjustment of residual backoff delays. The latter is desirable in order to preserve the age ordering implicit in the backoff approach. Older packets would not be put at a disadvantage relative to new arrivals if the latter are drawn from a backoff window shortened as a result of traffic adaptation. The implicit preservation of age ordering achieved through residual backoff adaptation leads to lower delay and jitter, which are attractive for isochronous and real-time traffic streams.

SUMMARY OF THE INVENTION

In accordance with the invention, the random backoff delay used in CSMA protocols is selected randomly from a statistical distribution, whose mean and variance are set adaptively in response to the observed traffic intensity and/or congestion estimates. The parameters of the statistical distribution may consist of a contention window size CW(A) which has an initial lower value L(A) and an initial upper value U(A). Congestion estimates are derived from data that include: feedback on the success or failure of a transmission attempt, the number the medium is idle, the number of re-transmissions attempted by a node and by each of its neighbor nodes and from the age of such retrials.

Further in accordance with the invention, a new residual backoff delay is determined for a backlogged terminal/application by functions that depend on the traffic intensity and/or congestion estimates, and on the time spent by the packet waiting for transmission.

Still further in accordance with the invention, adaptation to traffic is achieved through the use of "backoff scaling". Upon arrival, or upon transmission retrial, of a packet pending transmission, a backoff delay is drawn from a traffic-adapted backoff distribution. Following a silent time slot, a station's backoff delay is decreased and transmission is attempted upon expiration of the counter, according to the conventional backoff countdown procedure. In the proposed backoff procedure, if feedback is received at a given time slot concerning traffic intensity changes, the backoff counter is scaled up or down, depending on the direction of the traffic change. Feedback can be based on the number of idle time slots, the number of collisions, or other performance parameters such as latency and dropped packets. Scaling can be applied to both the residual backoff delay of backlogged terminals and the parameters of the random distribution (such as the offset and the contention window size) from which backoff values are drawn for new arrivals.

Still further in accordance with the invention, several input parameters provide differentiation between different urgency class transmissions. Differentiation between different urgency class transmissions is achieved through the use of class-specific parameters of the probability distribution used to generate random backoff times and class-specific backoff retry adjustment functions. A separate number of transmission attempts is remembered or broadcast for each urgency class; and congestion is thus estimated for each urgency class. This is made possible through the introduction of new fields in all reservation messages, including request to send (RTS) and clear to send (CTS), as well as headers of transmitted packets. The fields indicate the number of transmission attempts. Differentiation between different urgency class transmissions is achieved through the use of class-specific backoff retry parameters. The backoff retry parameters determine how the backoff distribution parameters are adjusted on successive retries following transmission failure. Differentiation between different urgency class transmissions is achieved through the use of a persistence factor, $pf_i$, that is different for each class i, which is used to multiply the backoff window from which backoff counters will be drawn randomly upon transmission retrial.

DESCRIPTION OF THE FIGURES

FIG. 1A is a network diagram of a prior art single-cell wireless LAN, operating with the CSMA/CA protocol.

FIG. 1B is a timing diagram of the prior art CSMA/CA protocol operating in FIG. 1A.

FIG. 1C is a more detailed timing diagram of the prior art CSMA/CA protocol of FIG. 1B.

FIG. 1D Illustrates the prior art technique for computing the random backoff interval in the CSMA/CA protocol of FIG. 1C.

FIG. 4 is a message format diagram of a message, such as a request to send (RTS) and clear to send (CTS), or a header of transmitted packet, indicating the number of transmission attempts. Congestion is estimated for each urgency class through the introduction of this message format.

FIG. 6 illustrates backoff adaptation timing for own transmission, and good observed transmission.

FIG. 7 illustrates backoff adaptation timing, ACK timeout, and recovered observed transmission failure.

FIG. 8 illustrates backoff adaptation timing, observed successful RTS and observed transmission failure.

DISCUSSION OF THE PREFERRED EMBODIMENT

Ethernet-type random medium access methods, which rely on backoff for collision avoidance/contention resolution, can benefit from adaptation to traffic intensity; this can be achieved through backoff scaling. Such methods apply to both wireless and wired media.

Scaling can be applied to both the residual backoff counters of backlogged terminals and the parameters of the random distribution (such as the offset and the contention window size) from which backoff values are drawn for new arrivals. Suppose a traffic burst is causing collisions and as a result the increase adjustment factor R=1 has been determined and supplied to the MAC sublayer of a backlogged station. Suppose there are six stations with pending packets, with counter values equal to: (1, 1, 1, 2, 2, 3). Suppose further that, according to the scaling procedure, each station draws the following random numbers from the range [0,1]: (0, 1, 0, 0, 1, 0). As shown in FIG. 4, the adjusted counter values of the six stations become: (1, 2, 1, 3, 4, 5), which suggests that fewer collisions will be experienced.

Figure 5:
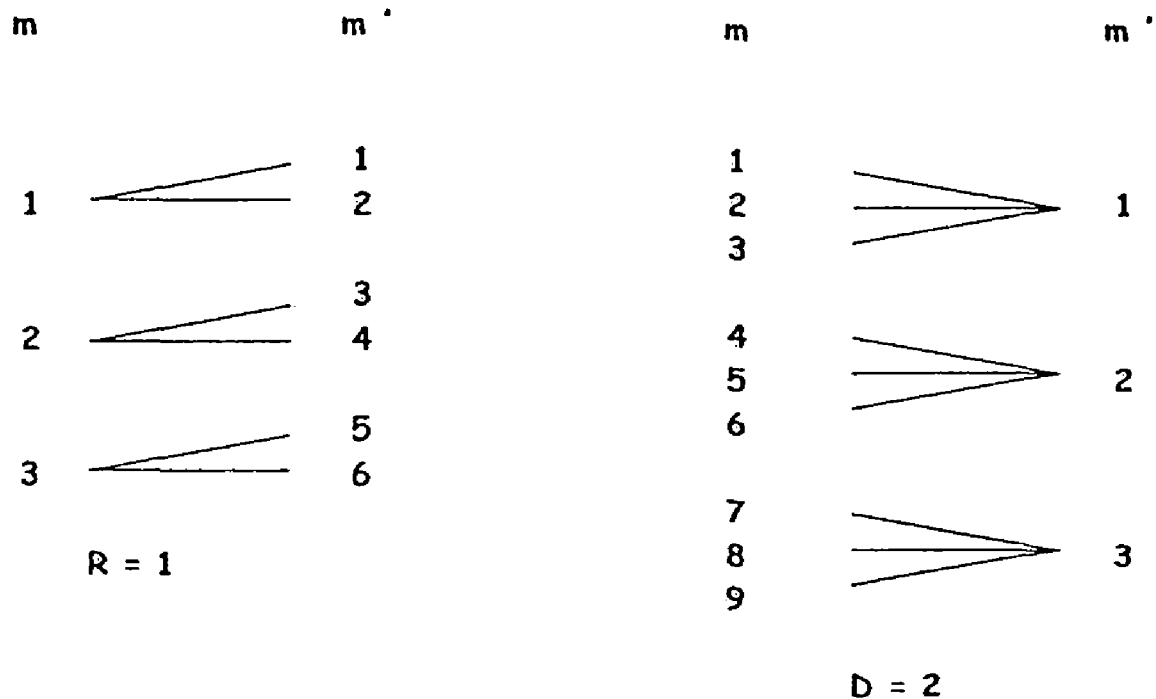
FIG. 5 illustrates the backoff scaling example.

In another situation, suppose that, after an interval of bursty traffic, there are sequences of idle time slots sensed on the channel. As a result, suppose that the decrease adjustment factor D=2 is determined and supplied to the MAC sublayer of all backlogged stations. Suppose the counter values of three backlogged stations are: (2, 4, 7). As shown in FIG. 5, the adjusted counter values become: (1, 2, 3), leading to shorter countdown time and hence less channel idle time.

Figure 9:
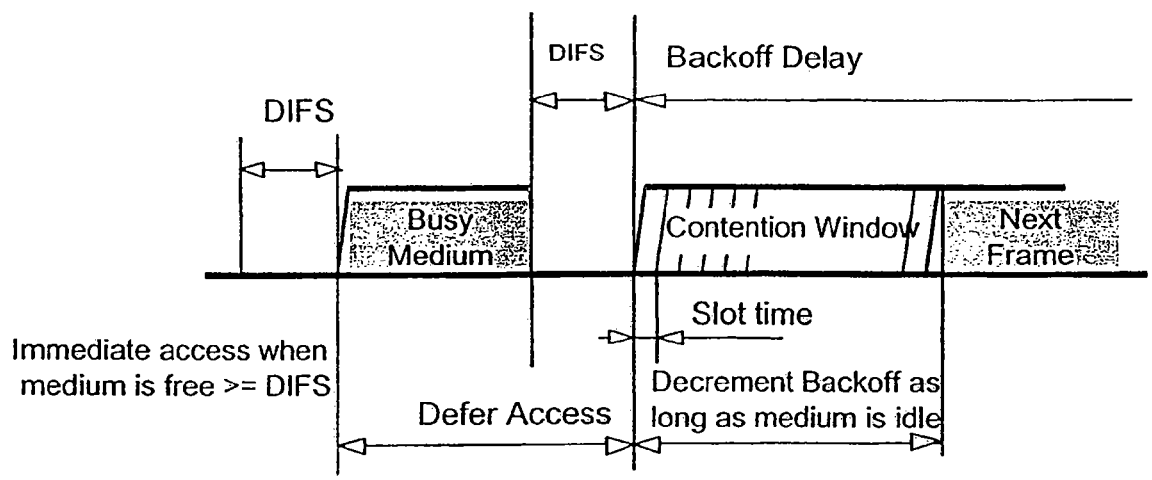
FIG. 9 is a timing diagram of the DCF backoff procedure.
Figure 10:
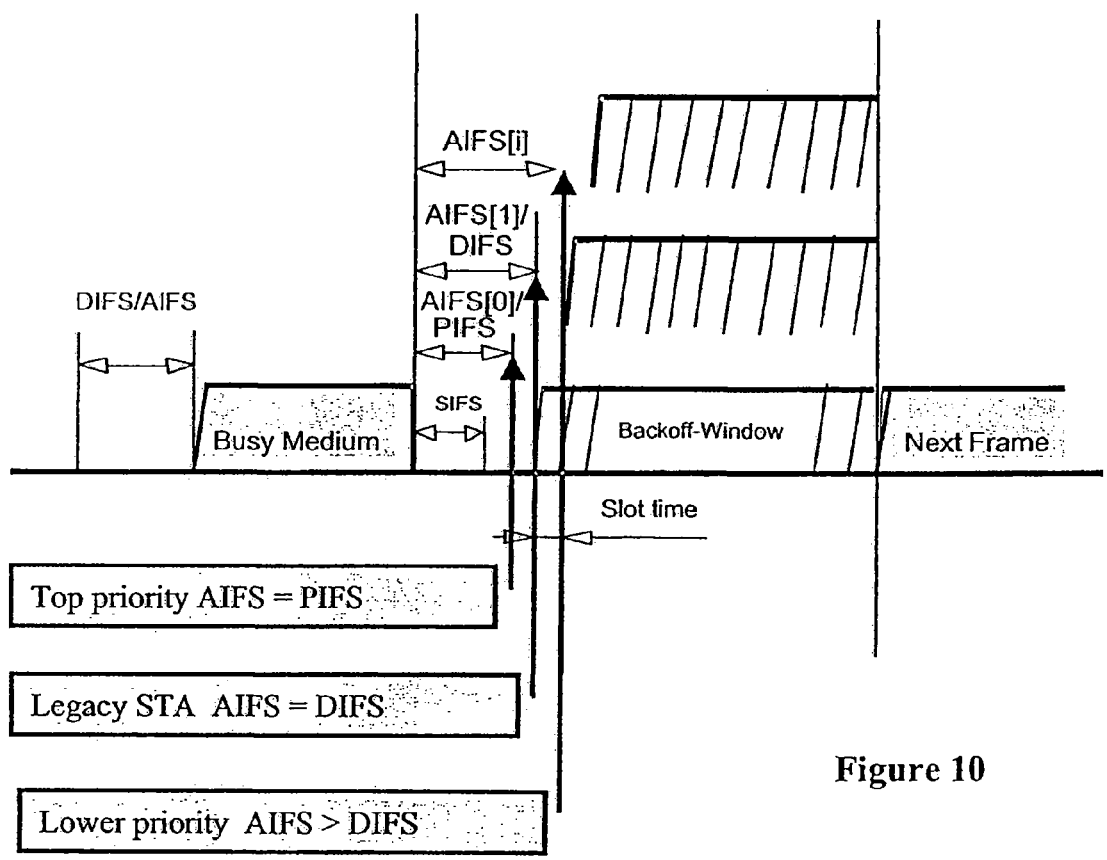
FIG. 10 is a timing diagram of priority differentiation by arbitration time.
Figure 11:
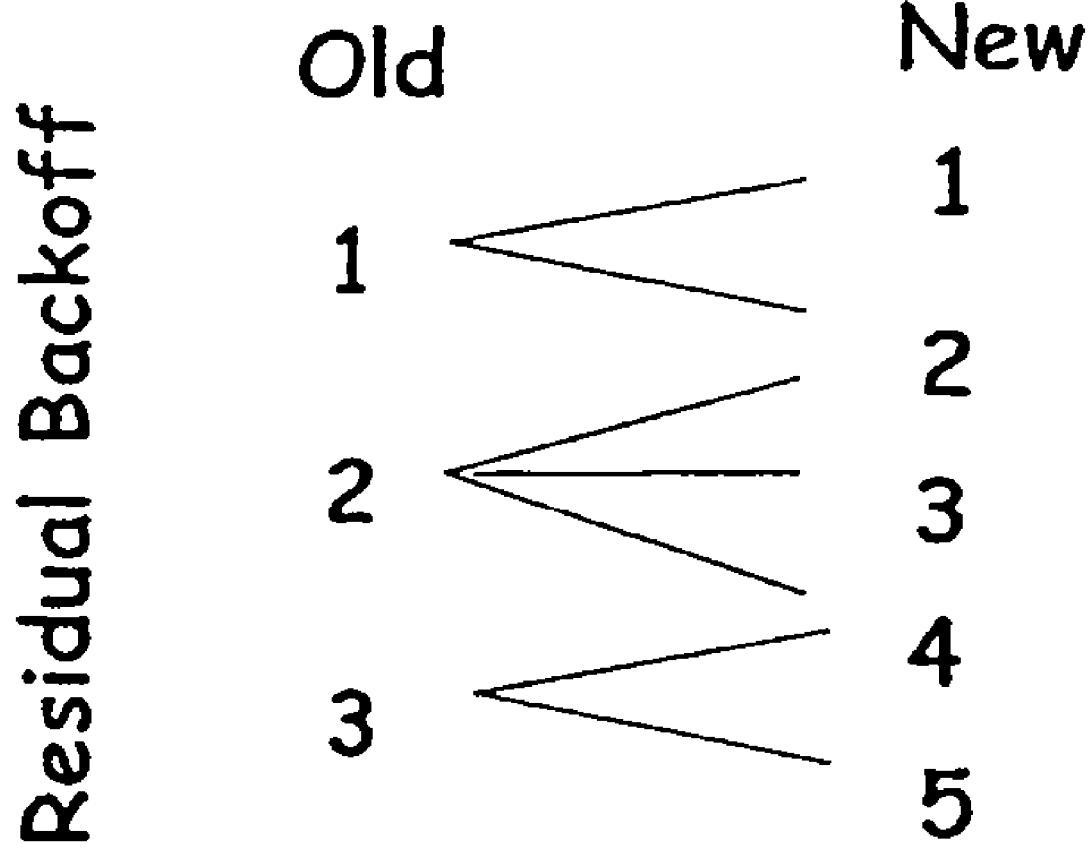
FIG. 11 illustrates backoff scaling.

FIGS. 9, 10, and 11 illustrate the definition of the various times and time intervals used in the scaling procedure using an example from the IEEE 802.11 EDCF protocol. Backoff adaptation provides for adjustment in the $aCWSize_i$ parameter that is advertised to the BSS by the AP in the EDCF Element of Beacon and Probe Response frames. The adjustments take advantage of short-term statistical fluctuations in traffic load, especially prevalent with bursty traffic, as it allows the number of channel idle slots to be reduced or provide a reduction in the number of collisions through continuous feedback and adjustment.

Given feedback concerning channel contention, the AP scales the value of $aCWSize_i$ up or down depending on the channel conditions observed. Feedback is based on the number of idle slot times, and the number of detected failed or successful transmissions. Based on this feedback, two estimates are maintained as described below: the MPDU arrival rate; and the expected number of backlogged stations having a backoff value equal to 1. If the expected number of backlogged stations having a backoff value equal to 1 is greater than 1, the value of $aCWSize_i$ is scaled up; if this number is less than 1, $aCWSize_i$ is scaled down. ESTAs set their aCWSize$_i$ to the value in the EDCF Element upon joining a BSS or IBSS or whenever they detect any change in the advertised values of $aCWSize_i$.

Scaling adjustments are made at prespecified sizes, $ST_{up}$ for scaling up, and $ST_{down}$ for scaling down, which could take either integer or fractional positive values. Examples would be $ST_{up}=\frac{1}{2}$ and $ST_{down}=\frac{1}{3}$.

The following constants can then be specified:

$$C_R = ST_{up} + 1 = 1\frac{1}{2},$$

and $$C_D = \frac{1}{ST_{down}+1} = \frac{3}{4}$$

where, $C_R$ is the scale-up factor and $C_D$ is the scale-down factor.

When the Scaling Procedure described below indicates that a scale-up factor should be applied, the AP derives new value of $aCWSize_i$ using the following equation:

$aCWSize_i=\text{trunc}[C_R \cdot aCWSize_i+0.5]$ where $aCWSize_i$=current backoff window size for urgency class i When the Scaling Procedure described below indicates that a scale-down factor should be applied, the AP derives new values of $aCWSize_i$, using the following equation:

$aCWSize_i=\max\{\text{trunc}[C_D \cdot (aCWSize_i+ST_{down})],2\}$

The scaling algorithm determines whether to scale-up or down by estimating the expected number $b_1$ of backlogged stations having a backoff counter equal to 1, based on the observed outcome. The AP maintains an estimate of the probability $p_1$, which it updates by following each scaling adjustment. The AP maintains also an estimate of the expected number n of backlogged terminals. The product $n \cdot p_1$ gives $b_1$, the number of backlogged stations having a backoff counter equal to 1.

When scaling up, $p_1$ is updated by dividing by the factor $C_R$.

$$p_1 \leftarrow \frac{p_1}{C_R}$$

When scaling down, $p_1$ is updated by dividing by the factor $C_D$.

$$p_1 \leftarrow \frac{p_1}{C_D}$$

The time to scale up or down by the specified step size $ST_{up}$ or $ST_{down}$ is established by the following conditions. Ideally, to minimize the likelihood of a collision, the expected number of backlogged stations with a backoff counter of 1 must be equal to 1. That is, the following equation is met under optimal conditions:

$b_1 = n \cdot p_1 = 1$ where n is the number of backlogged stations; and $p_1$ is the probability of having a backoff counter equal to 1.

The condition for scaling up by an adjustment factor $ST_{up}$ is the following:

$n \cdot p_1 \geq C_R$.

This ensures not only that $b_1 = n_1 \cdot p_1 > 1$ when scaling up, but also that scaling up by the step size $ST_{up}$ is not excessive; that is, it would not cause a change of the inequality in the opposite direction.

The condition for scaling down by an adjustment factor $ST_{down}$ is the following:

$n \cdot p_1 \leq C_D$; and $n \geq 2$.

This ensures both that $b_1 = n_1 \cdot p_1 < 1$, and that a down scaling adjustment of size $ST_{down}$ is not excessive and, thus, would not cause a change of the inequality in the opposite direction. In addition, the new backoff window size must be at least 2.

When the scaling conditions are met, the AP scales its $aCWSize_i$ parameters, as described above. The AP sets the EDCF Element values with the current values of $aCWSize_i$ in each Beacon or Probe Response that it transmits.

The AP bases the scaling adjustments described above on the outcome of contention-based transmissions. Contention based transmissions (CBTs) are all transmissions in the Contention Period that are not protected by a NAV. An observed successful transmission is any CBT that is received with a good CRC. CBTs with bad CRC are also classified as successful if they are followed after a SIFS period by an ACK or CTS that is received with a good CRC.

A value λ representing an estimate of the traffic arrival rate, is used in adjusting the estimated number of backlogged stations. An estimate of λ is maintained by the AP and derived from the following equation.

$$\lambda = \frac{N}{(T_0 - T_N)}$$

where, N is the number of observed successful CBTs; and $T_0-T_N$ is the time elapsed for the last N successful transmissions.

Since the adjustment of $aCWSize_i$, does not have immediate impact (it affects only new arrivals or retransmissions, and not the immediate transmissions by the backlogged terminals), the time spanned by the arrivals of the last N=20 packets would be appropriate. The AP updates the current λ value following each successful CBT. When a CFP occurs, updating of λ is suspended until N successful CBTs have been received after the end of the CFP and, until then, the last λ value is used. The $T_0-T_N$ interval is reset at the end of each CFP.

The AP maintains a variable $n_1$ representing an estimate of the number of backlogged stations. The value of $n_1$ is used to decide if a scale-up or scale-down is necessary. The procedure described below is used to $T_{AT}$ a time interval defined by two consecutive occurrences of the event $T_{AT}$. $T_{AT}$ marks the end of an idle time interval of length DIFS following an EIFS, an ACK or CTS timeout, or when both CCA and the NAV indicate the media is idle. The adjustment of $n_1$ is based on information obtained on the event $T_\delta$, which is defined as the time when CCA indicates that the medium is busy following an idle period started at time $T_{AT}$.

The AP adjusts $n_1$ for every idle backoff slot time. It may make this adjustment either at the end of every backoff slot using the following equation.

$n_1 = n_0 \cdot q + \lambda \cdot \beta$ where, $n_0$=value of $n_1$ in previous adjustment;
$q=1-p_1$; and
β=the slot time Or, it can make one cumulative adjustment at any time up to the next $T_{AT}$ occurrence by determining the number t of idle slots preceding the current transmission at time $T_\delta$ as follows:

$$t = \frac{T_\delta - T_{AT}}{\beta}$$

The value of $n_1$ is then adjusted by repeating the following equation t times.

$n_0 = n_1$; and $n_1 = n_0 \cdot q + \lambda \cdot \beta$

The AP calculates an interval δ in order to adjust the value of $n_1$. The interval δ is defined as follows:

$\delta = T_{AT} - T_\delta$

At any time after an observed successful CBT, up to the next $T_{AT}$ occurrence, the variable $n_1$ is updated based on the following "success" equation:

$n_1 = n_0 \cdot q + \lambda \cdot (\delta + \beta)$

At any time after an observed failed CBT, up to the next $T_{AT}$ time, the variable $n_1$ is updated based on the following "failure" equation:

$n_1 = n_0 + 2 + \lambda \cdot (\delta + \beta)$

Each time the variable $n_1$ is updated the AP sets $n_0$ equal to $n_1$.

Figure 2:
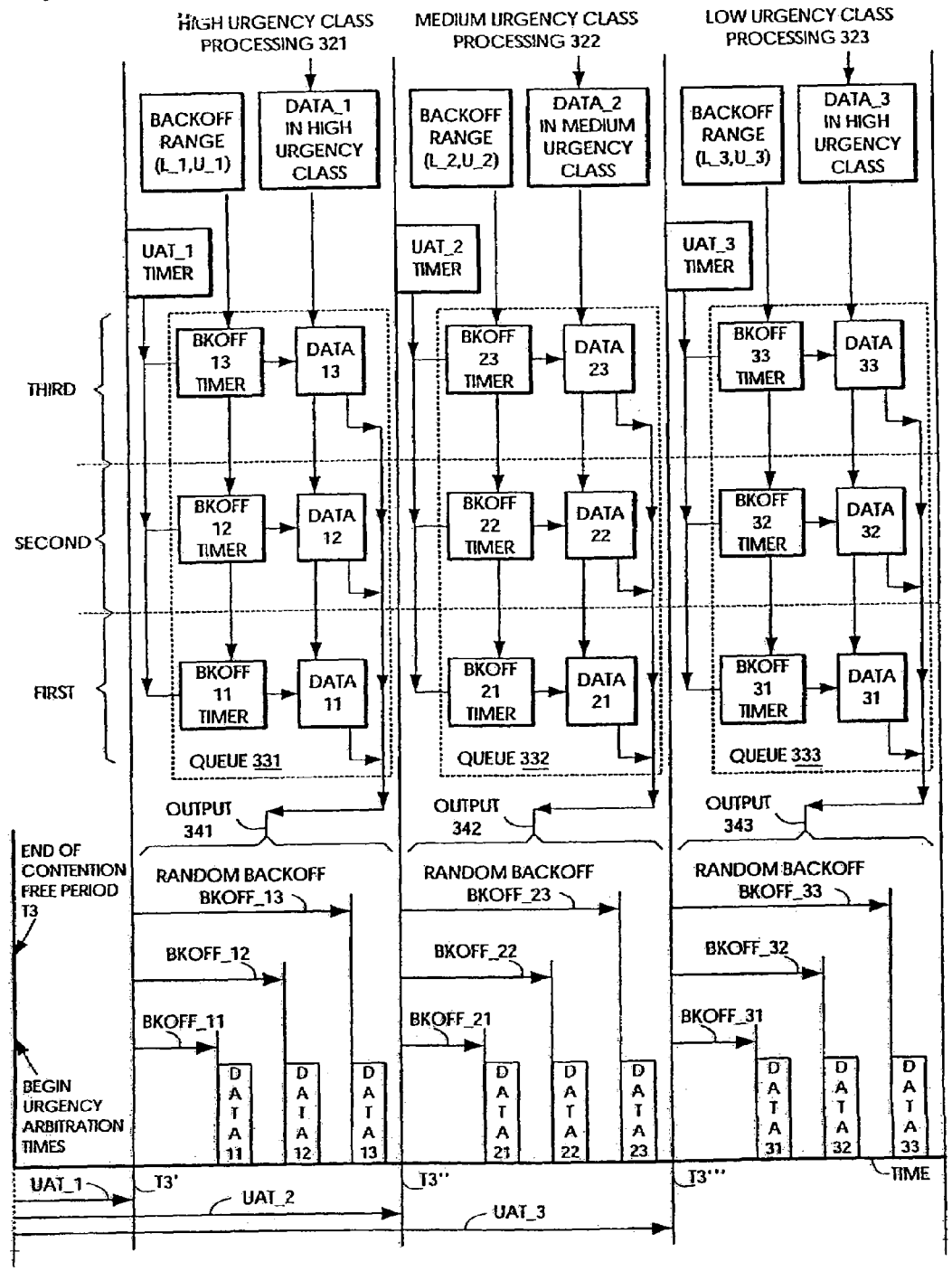
FIG. 2 is a more detailed functional block diagram of the TCMA urgency class processing based and the resulting ordering of the transmission of data packets for three urgency classes. The urgency class processing can be in a single wireless station with three different urgency classes or it can be distributed in multiple wireless stations, each with from one to three urgency classes.
Figure 3A:
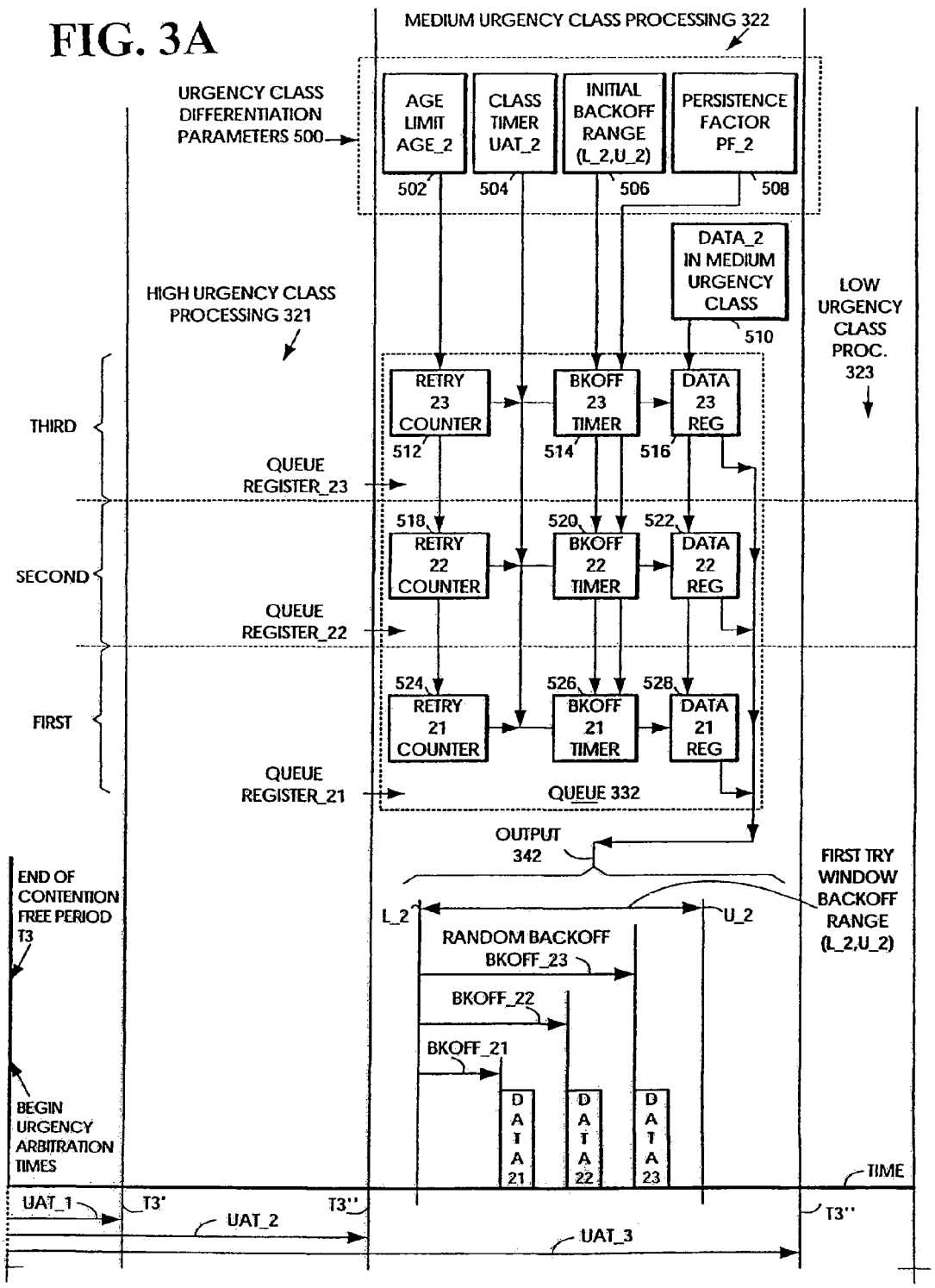
FIG. 3A is a more detailed functional block diagram of the TCMA urgency class processing of FIG. 2, showing several input parameters that provide differentiation between different urgency class transmissions for the medium urgency class for a first try backoff range L_2,U_2.

FIG. 3A is a more detailed functional block diagram of the TCMA urgency class processing of FIG. 2, showing several input parameters that provide differentiation between different urgency class transmissions. FIG. 3A shows the resulting ordering of the transmission of data packets for the medium urgency class for a first try backoff range L_2,U_2. Differentiation between different urgency class transmissions is achieved through the use of the class timer 504 providing class-specific urgency arbitration times (UATs). The arbitration time is the time interval that the channel must be sensed idle by a node before decreasing its backoff counter. Initial backoff range buffer 506 provides class-specific parameters of the probability distribution used to generate random backoff times and class-specific backoff retry adjustment functions. The backoff time is drawn from a uniform random distribution. The backoff retry parameters determine how the backoff distribution parameters are adjusted on successive retries following transmission failure. Age limit buffer 502 provides class-specific packet age limits. The age limits lead to the cancellation of a transmission if the time since arrival exceeds a threshold value. The persistence factor buffer 508 provides a persistence factor, $pf_i$, that is different for each class. The persistence factor, $pf_i$, that is different for each class i, will be used to multiply the backoff window from which backoff counters will be drawn randomly upon transmission retrial. FIG. 3A also shows the organization of the queue register_21, the queue register_22, and the queue register_23 in their respectively earlier to later time order in the urgency class processing 322.

Figure 3B:
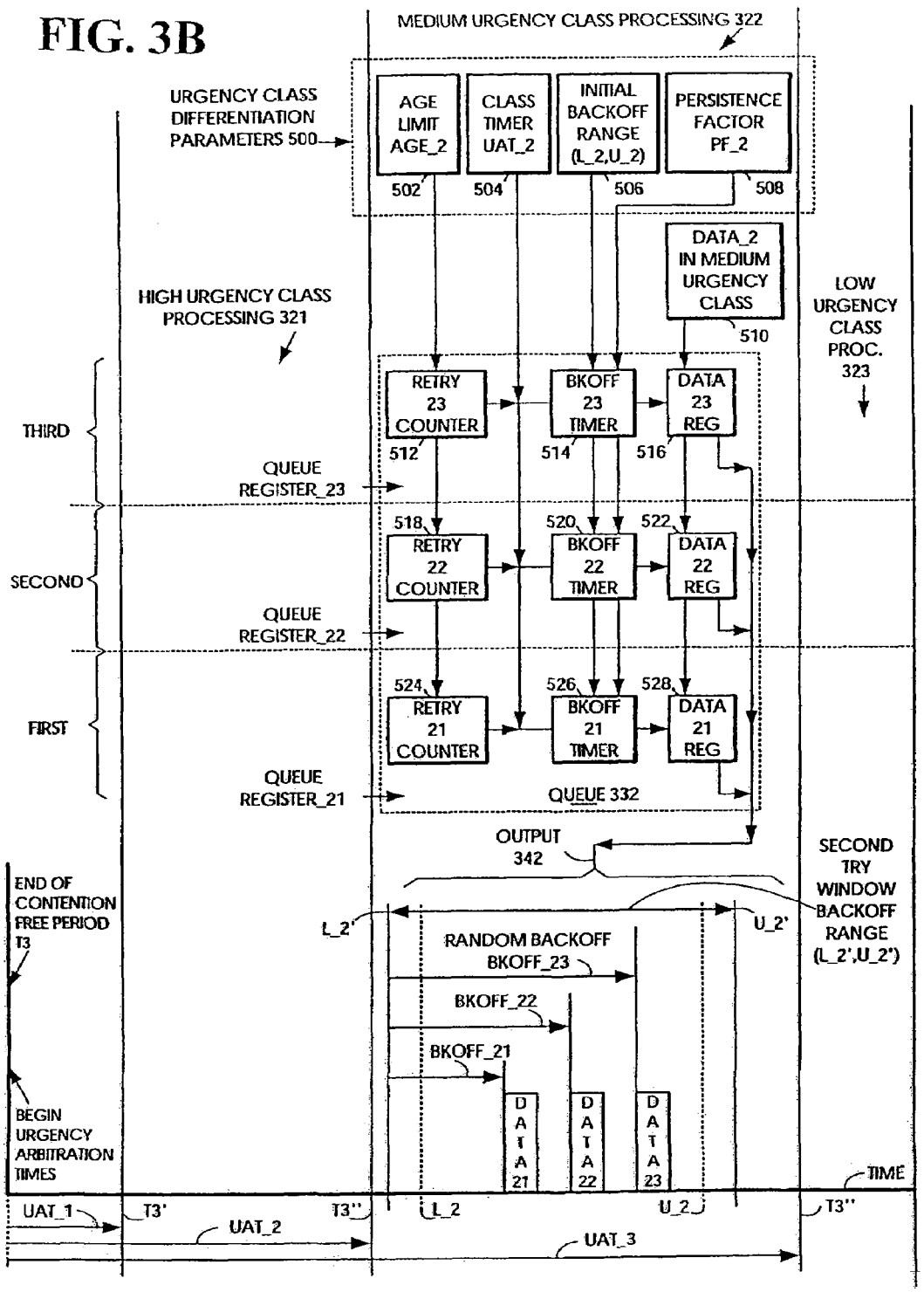
FIG. 3B is the same as FIG. 3A, but shows the resulting ordering of the transmission of data packets for the medium urgency class for a second try backoff range L_2',U_2'.

FIG. 3B is the same as FIG. 3A, but shows the resulting ordering of the transmission of data packets for the medium urgency class for a second try backoff range L_2',U_2'. If the transmission is not successful, the backoff distribution is altered before the random backoff counter is chosen for retry. The DCF doubles the backoff range (the backoff counter assumes larger values) following transmission failure. Hence, a packet is transmitted quickly in light packet traffic, but its transmission can be delayed substantially in congestion conditions. When a traffic stream requires low delay jitter, the goal is to minimize any deviation from the mean delay, which is better served if the delay is independent of packet-arrival rates.

The enhanced-DCF will employ a different discipline for different classes to adjust the backoff range when transmission fails. The initial backoff range buffer 506 provides a new backoff range (aLower[y],aUpper[y]) which will be determined by functions that depend on the packet's class, the traffic congestion estimates, which are derived by the Traffic Intensity Estimation Procedure (TIEP), and on the time spent by the packet waiting for transmission. These functions depend on the sensitivity of the class to delay or delay jitter. The persistence factor buffer 508 provides a persistence factor, $pf_i$, that is different for each class i, which will be used to multiply the backoff window from which backoff counters will be drawn randomly upon transmission retrial. Longer backoff ranges may be used initially for delay jitter sensitive traffic and, if transmission fails, contention persistence can be increased by shifting the backoff range to lower values for subsequent attempts. This will have the effect of postponing transmission and reducing the competition for the channel by new packet arrivals, giving a better chance to aging packets to transmit successfully. The overall delay jitter is thus minimized, making this discipline a better choice for isochronous traffic.

DETAILED DESCRIPTION OF THE INVENTION

Even though it has broader application, we describe the invention as it applies to IEEE 802.11 wireless LANs. They have the following components. A station is any device with conformant 802.11 interfaces to the wireless medium. A BSS (basic service set) is a set of STAs controlled by a single coordination function. Member STAs of a BSS can communicate easily. An IBSS (independent basic service set) is an ad hoc networked BSS; STAs communicate directly only. A DS (distribution system) provides address mapping and BSS integration into a network. An AP (access point) is a STA that provides access to the DS.

In an IEEE 802.11 WLAN, the channel is shared by a centralized access protocol—the Point Coordination Function (PCF)—which provides contention-free transfer based on a polling scheme controlled by the access point (AP) of a basic service set (BSS). [IEEE Standards Department, D3, supra] The centralized access protocol gains control of the channel and maintains control for the entire contention-free period by waiting a shorter time between transmissions than the stations using the Distributed Coordination Function (DCF) access procedure. This invention deals with the DCF.

DCF Distributed Access Mechanism

In CSMA/CA (carrier sense multiple access/collision avoidance), the channel is sensed before transmission and backoff is chosen to postpone transmission by random amount if the medium is busy. Binary exponential backoff for collision resolution occurs upon collision and causes the range of backoff delay to double. The RTS/CTS (request to send/clear to send) reservation is optional, wherein messages are exchanged to reserve the channel for point-to-point transmissions. The NAV (network allocation vector) is used for 'virtual' carrier sensing. In operation, nodes other than the destination set the NAV and refrain from accessing the medium for the NAV duration which is transmitted in the MAC. Frames are fragmented into MSDUs (MAC service data units) which are "packets" received from/delivered to the upper layers. In best-effort connectionless user data transport, the MPDUs are transmitted as independent entities.

DCF Backoff Procedure

A STA transmits a new frame if the medium is idle for a period>=DIFS (DCF inter-frame space). If the medium is busy, transmission is deferred for a random backoff delay. The backoff countdown is shown in FIG. 12. The countdown starts/resumes following a busy condition after the medium is idle for a period>=DIFS. The backoff reduces the delay by 1 for every slot the medium is idle. The backoff is interrupted when the medium becomes busy. The STA transmits when backoff expires.

If the channel has been idle for a time period of length DIFS when a new frame arrives, the station may transmit immediately. However, if it is busy, each station waits until transmission stops, and then enters into a random backoff procedure. This prevents multiple stations from seizing the medium immediately after completion of the preceding transmission as they defer transmission for randomly selected time intervals. A backoff delay is chosen randomly from a range of integers known as the contention window. This delay measures the total idle time for which a transmission is deferred. It is expressed in units of time slots. The length of a time slot is sufficient to enable carrier sensing.

An internal counter is set to the selected backoff delay. The counter is reduced by 1 for every time slot the medium remains idle. Backoff countdown is interrupted when the medium becomes busy. The counter setting is retained at the current reduced value for subsequent countdown. Backoff countdown may not start or resume until the channel has been idle for period of length equal to DIFS.

If the counter reaches zero, the station may begin transmission.

QoS MAC Enhancements of the DCF

The QoS-enhanced DCF schedules transmission of different types of traffic based on their service quality specifications. The competing nodes generate various types of traffic streams that may differ by their sensitivity to delay. Real-time traffic streams such as voice and video are delay-sensitive with limited tolerance for long delays. Such services can tolerate some packet loss. Music and video on demand are examples of isochronous traffic that tolerate longer delay but limited delay jitter. Their tolerance for packet loss is comparable to that of real-time traffic. Finally, data applications such as file transfers or e-mail are delay-insensitive but intolerant of packet loss. They are commonly referred to as best-effort traffic.

Because of the limited tolerance for delay, the transmission of different types of packets warrants different urgency. Each node determines the urgency class of its pending packets according to a scheduling algorithm. There are several urgency classes. The urgency class indicates the desired ordering. Pending packets in a given urgency class must be transmitted before transmitting packets of a lower urgency class. Two basic approaches can be used to impose this ordering: a backoff counter or a persistence probability.

QoS enhancements are necessary in order to facilitate streaming of voice and multimedia traffic together with data. The high error rates experienced in transmitting over a wireless medium can lead to delays and jitter that are unacceptable for such traffic. More delay is added by acknowledgements that become necessary for wireless transmissions, and by the RTS/CTS mechanism if used.

The TCMA protocol is designed to reduce the collision probability between enhanced stations (ESTAs) of different urgency classification accessing a medium, at the point where collisions would most likely occur. Just after the medium becomes idle following a busy medium (as indicated by the clear channel assessment (CCA) function) is when the highest probability of a collision exists. This is because multiple ESTAs could have been, and with congestion will probably be, waiting for the medium to become available again. This is the situation that necessitates use of TCMA, which relies on different arbitration times to provide prioritized access to transmissions of different classification, followed by random backoff procedure to resolve medium contention conflicts among transmissions of the same class.

TCMA Prioritization Criteria

Delay and jitter are reduced in the following ways. Frames are assigned priority classes, which enables differential treatment of queued frames upon transmission. The priority class indicates the desired ordering of transmission. The ordering guidelines are as follows. Frames ready for transmission (that is, frames with expired backoff) in a given priority class must be transmitted before transmitting frames of a lower priority class. Hence, higher priority frames will be given preference over lower priority ones in congestion conditions (when there is high likelihood of a higher-priority frame having a backoff time of 1). But in general, it is not desirable to postpone transmission of lower priority frames merely because there are higher priority frames pending transmission. The latter would penalize the lower priority traffic classes excessively.

There are nPC priority classes defined for all traffic packets which are permanently assigned to a packet once generated; nPC=8, according to IEEE 802.1d Annex H.2. A node may generate more than one type of packets. When a new packet is generated at a node, it joins the pool of packets waiting transmission (PWT). It is assigned an urgency class. There are nUC urgency classes employed in contending for the channel. nPC and nUC are not equal; nUC is less than nPC and equal to 4.

Unlike the assignment of a priority class to a transmission, and in order to afford the greatest flexibility, urgency classification is not tied exclusively to the traffic type; it also relies on performance parameters as they are observed in real time. The capability to update the urgency class of a packet in real time is used to reflect both the priority class of the packet and the order in which packets of different traffic classes and ages must be transmitted from a node. For instance, the scheduling algorithm will advance packets with short remaining life to a higher urgency class. For example, an isochronous application packet would be placed in the buffer with a lower urgency classification at first and then be upgraded to the same urgency as a real-time application packet if its delay approaches a critical level.

Backoff Countdown Procedure

A backoff counter is employed in the same way as in binary exponential backoff. Typically, the backoff counter is selected randomly from a range of values, referred to as the backoff window, the reason for the randomness being to avoid collisions that would occur if more than one node has packets awaiting transmission. The backoff counter is decreased when the channel is idle for a given time interval and transmission is attempted when it expires. In case of collision, the backoff procedure is repeated up to a maximum number of times, until a specified backoff range is reached. Once this occurs, the packet transmission is cancelled.

Backoff countdown requires that the channel is sensed for a given time interval, whose specification varies in different implementations of the backoff-based collision resolution. This discussion considers two variations of the countdown procedure: the classic backoff and the backoff with preparation.

With classic backoff, the backoff counter is decreased when the channel is idle for a specified time interval, which is referred to as the backoff-counter update time (BCUT). Transmission is attempted when the counter expires. Following the transmission on the channel, a node with backoff counter equal to 1 senses the channel, which is idle. After a time interval BCUT, the node's backoff counter begins its count down and when it expires, the node transmits. Transmissions by the other nodes follow.

Backoff with preparation is a variation of the backoff described above, practiced in the IEEE 802.11 Wireless Local Area Network (WLAN) medium access control (MAC) protocol. [IEEE Standards Department, D3, supra] As in classic backoff, the backoff counter is decreased whenever the channel is idle for a time interval equal to BCUT, except immediately following a transmission. After a transmission is sensed on the channel, the duration of the idle required for backoff adjustment is longer; the channel must be idle for an additional time interval, which is referred to as the backoff-counter preparation time (BCPT), before countdown starts. Following the transmission on the channel, a node with back-off counter equal to 1 senses the channel, which is idle. The node waits for a time interval equal to BCPT, after which the countdown procedure starts. After a time interval BCUT, the node's backoff counter expires, and the node transmits; and other nodes follow. It is worth noting that classic backoff is a special case of backoff with preparation where BCPT=0. BCPT is equal to the Distributed Coordination Function interframe space (DIFS), and BCUT is equal to the slot time for the IEEE 802.11 Standard. [IEEE Standards Department, D3, supra]

As explained below, these basic procedures are followed, but with certain modifications. They involve the length of the idle time interval required before the backoff counter is decreased—called the arbitration time, the adjustment of the backoff window, and the fate of packets reaching their transmission retrial limit.

Contention for the channel at any point in time is restricted to members of the same urgency class, and packet transmissions are ordered according to their urgency class; hence the name "tiered contention". Partitioning of contention is accomplished through the specification of the length of the arbitration time. The arbitration time is the time interval that the channel must be sensed idle by a node before starting to decrease its backoff counter. By using a different arbitration time for each urgency class, separation of contention by urgency class is achieved. Herein, this arbitration time is called the urgency arbitration time. Ordering of transmissions by urgency classification is accomplished by assigning shorter arbitration times to the more urgent traffic. This way, lower urgency packets will not cause collisions to higher urgency packets, and will only attempt to seize the channel if there are no higher urgency packets pending transmission.

By assigning shorter arbitration times to higher urgency packets, higher urgency packets will dominate the channel in congestion, as lower urgency packets would get less of a chance to decrease their backoff counters because of their longer arbitration time. Lower urgency packets will not cause collisions to higher urgency packets and will only be able to seize the channel if there are no higher urgency packets trying to transmit.

Collisions between packets of different urgency classes are avoided if the arbitration times are selected properly. Depending on the backoff countdown procedure employed, contention partitioning can be achieved through variation by urgency class of either of the two idle-time requirements or both of them together. In other words, the urgency arbitration time could be differentiated by one of the following: the backoff-counter preparation time (BCPT)—yielding an urgency arbitration time that is equal to $UAT_i^0$; the backoff-counter update time (BCUT)—yielding an urgency arbitration time that is equal to $UAT_i^1$; or both times —yielding an urgency arbitration time that is equal to the sum In the last case, when assigning urgency arbitration times to classes, the BCUT value chosen for a lower priority class may not be less than that of higher priority class. Naturally, the difference between the arbitration times of two different urgency classes must be at least equal to the time necessary for a station to discern that another station has seized the channel.

In order to simplify the following discussion, arbitration time differentiation by BCPT is used.

Backoff countdown will proceed under the enhanced-DCF as under the DCF. The backoff countdown is started following a time interval during which the medium is determined to be idle for the duration of the UAT after a transmission. The backoff counter is decreased by 1 for each consecutive time slot during which the medium continues to be idle.

If the medium is determined by the carrier-sense mechanism to be busy at any time during a backoff slot, then the backoff procedure is suspended; it is resumed again once the medium shall be determined to be idle for the duration of UAT period. Transmission shall commence whenever the backoff counter reaches zero.

It is important to recognize that the use by different urgency classes of UAT values different by aSlotTime minimizes the probability that packets from such classes will collide in congestion conditions; in conditions whereby several ESTAs have packets of higher classifications with nearly expired backoff counters —that is, equal to 1—the possibility of collision is eliminated. In such conditions, higher urgency packets will be transmitted before lower urgency packets.

Backoff Window Adjustment

Present implementations of backoff double the backoff range (the backoff counter assumes larger values) following transmission failure. Hence, a packet is transmitted quickly in light packet traffic, but its transmission can be delayed substantially in congestion conditions. When a traffic stream requires low delay jitter, the goal is to minimize any deviation from the mean delay, which is better served if the delay is independent of packet-arrival rates. Moreover, with congestion-adaptive backoff (see below), the random backoff values used on the first transmission attempt are drawn from a backoff distribution window that is appropriate for the traffic intensity at hand. Hence, it is no longer necessary to vary the range of backoff window size widely in search of a window size that will enable successful access at the present contention level.

TCMA employs a different discipline for different classes to adjust the backoff range when transmission fails. The new backoff range, (aLower[y],aUpper[y]), is determined by functions that depend on the packet's class, the traffic congestion estimates, which are derived by the Traffic Intensity Estimation Procedure (TIEP) discussed herein, and on the time spent by the packet waiting for transmission. These functions depend on the sensitivity of the class to delay or delay jitter. A persistence factor, $pf_i$, that is different for each class i, will be used to multiply the backoff window from which backoff counters will be drawn randomly upon transmission retrial. Longer backoff ranges may be used initially for delay jitter-sensitive traffic; and if transmission fails, contention persistence could be increased by shifting the backoff range to lower values for subsequent attempts. This will have the effect of postponing transmission and reducing the competition for the channel by new packet arrivals, giving a better chance to aging packets to transmit successfully. The overall delay jitter is thus minimized, making this discipline a better choice for isochronous traffic.

Because of its tendency to reduce long delays, this discipline would be preferable, in congestion conditions, to decreasing backoff ranges even for real-time traffic, albeit delay-sensitive. There is a tradeoff, however, as high backoff counters postpone the transmission of the packet unnecessarily in light traffic conditions.

Class Differentiation Attributes

Both the DCF and TCMA employ CSMA/CA, with certain enhancements added for the latter to enable differential treatment of packets with different urgency classes. The access rules used by different traffic categories are differentiated with respect to four attributes: (1) the arbitration time, the time used for backoff countdown deferral; (2) the size of the contention window from which the random backoff is drawn; (3) the 'persistence factor' used in determining the size of the contention window in collision resolution; and (4) the MAC-layer dwell time. The arbitration time is the time interval that the channel must be sensed idle by a node before decreasing its backoff counter. The persistence factors is the multiplier of the initial backoff window size to yield the backoff window in successive retransmission attempts. The dwell times are age limits leading to the cancellation of a transmission if the time since arrival exceeds a threshold value.

Arbitration time is the time interval the medium must be idle before a node (queue) starts/resumes backoff countdown. If arbitration-time is pursued through the BCPT, a new IFS: AIFS (arbitration-time inter-frame space) is provided, for deferral of backoff countdown as shown in FIG. 10. AIFS serves the same role as DIFS in the present standard. Higher-priority frames have a shorter AIFS.

Distinct priority treatment is achieved by AIFS lengths differing by at least one time slot. The slot duration, which depend on the physical layer technology, is to allow enough time for a station to sense the medium and determine whether it is busy. For example, one priority traffic will have an AIFS=PIFS, the next priority level will have the same AIFS as legacy stations, namely DIFS, and lower priority levels will have increasing AIFS length.

Because the time in which the CCA function can be completed is set at the minimum attainable for the PHY specification, and as a result arbitration-time differentiation alone provides for a single "high" priority class, further differentiation in priority access is pursued through different backoff time distributions.

How TCMA Works

Priority differentiation by arbitration time in TCMA works in two ways. It offers not only prioritized access to frames ready for transmission, but also retards the backoff countdown process of lower-priority frames in congestion conditions. Lower-priority frames cannot countdown their backoff if there are higher-priority frames with backoff equal to 1 waiting to transmit. This is what helps higher priority frames access the channel more readily in a minimally disruptive way, thus resulting in lower delays.

Consider the example of three nodes have frames queued for transmission, one each. Node A has lower priority than nodes B and C, and hence longer AIFS. At time T0, when the busy interval is over, the residual backoff times of nodes A, B, and C are 1, 2, and 1, respectively. Following the current transmission, node C waits for a time interval equal to its AIFS, after which it starts backoff countdown. Node B does the same. The backoff timer of node C, starting at 1, will expire after a slot time. At that point the node transmits. The backoff of node B, which started at 2, has become 1 by that time. Node C, which has lower priority and, hence, longer AIFS will not be able to decrement is backoff because the channel gets busy again before it can start backoff countdown. Once the backoff of node B expires and it transmits the queued frame, channel idle time exceeds the AIFS of node A. It can then count down its backoff and then transmit its queued frame. So, even though node B has a longer backoff delay than node A, it transmits sooner because of its higher priority.

Stations Generating Multiple Classes of Traffic

An example would be a PC receiving an audio-video stream and uploading data. Traffic generated by applications on a single station is processed as if it were generated by different stations each producing one type of frame. Separate queues are maintained for different priority classes—or combination of classes if the number of queues is smaller than the number of traffic classes. Each queue follows the access rules that apply to its class. Refinements are introduced to the protocol that avoid collisions in a traffic-class aware manner; and reduce overhead. 'Fair' treatment of all traffic is thus provided, as packet of a given category generated within the BSS will experience delays independent of whether the packet came from a station with a single type of packets or with more types.

Packets generated by stations with multiple traffic types will not be disadvantaged relative to packets from stations with a single type of traffic because of a single contention point. Parallel queues shall be maintained within the node for each class, each adhering to backoff principles consistent with that class. The only advantage enjoyed by different-priority frames generated by applications in the same station is that they do not experience inter-queue collisions, something otherwise possible.

The queues need not be independent, however, as packets may change queues when their classifications are adjusted; their position in the new queue shall be determined by the Traffic Reclassification algorithm. The transmission of packets with excessive latency is cancelled, causing a packet to leave its queue prematurely.

Each contending ESTA has access buffer of size 1. When a packet's backoff counter becomes 0, it shall be placed in the access buffer and attempt to seize the channel. In case of a tie, the access buffer packet will be selected according to the urgency classification of the tied packets. The higher priority packet will be chosen. The packet not chosen shall follow the contention resolution procedure applicable to its class; namely, it will draw a new random backoff counter and engage in backoff countdown until its backoff counter expires. If transmission of the chosen packet fails, it shall proceed in accordance with the contention resolution procedure applicable to its class.

The above discussion shows that if an ESTA generates several types of packets, scheduling procedures internal to the ESTA will select the packet to be transmitted. Thus, for simplicity of presentation, it is assumed in the ensuing discussion that at any point in time, an ESTA is concerned with the transmission of packets of a single type.

TCMA Backoff Counter Distribution

An ESTA desiring to initiate transfer of data under enhanced-DCF will proceed as under DCF with some differences. The period of time required of the medium to be idle without interruption, as determined by the carrier-sense mechanism, is equal to UAT, a duration that depends on the data classification. After this UAT medium idle time, the ESTA shall then generate a random backoff counter, unless the backoff timer already contains a nonzero value.

The random backoff counter will be drawn from a uniform distribution with range [rLower,rUpper] where the backoff window size (rUpper−rLower), or equivalently its variance ((rUpper−rLower)**2)/2, is selected based on the traffic intensity in that class. The mean of the distribution, which is equal to (rLower+rUpper)/2, will be chosen to reflect the traffic intensity in classes of greater urgency; higher intensity in classes of greater urgency would increase the mean of the backoff counter distribution. Traffic intensity will be estimated through the Traffic Intensity Estimation Procedure (TIEP). The lower bound of the random backoff range, rLower, will be greater than or equal to 1 for the enhanced-DCF classes with UAT=PIFS so that they do not collide with transmissions generated by the centralized access protocol.

TCMA Overview

To summarize, the mechanism for collision resolution in TCMA employs a backoff counter resident at each node contending for the channel in the same way as in binary exponential backoff, but with arbitration times and persistence factors that are differentiated according to urgency classes. In the absence of other multiple access control protocols with which compatibility is sought, TCMA is described as follows:

1. An urgency class i is assigned to the packet in the access buffer of each node according to a standardized deterministic scheduling algorithm internal to the node.
2. Each node selects a backoff counter randomly from a statistical distribution, whose mean and variance are set adaptively in response to the observed traffic intensity.
3. The parameters of the backoff-counter initial distribution are adjusted based on estimates of traffic intensity in each urgency class.
4. Congestion estimates are derived from data that include: feedback on the success or failure of a transmission attempt, the number of re-transmissions attempted by a node and by each of its neighbor nodes and from the age of such retrials. A separate number of transmission attempts is remembered or broadcast for each urgency class; and congestion is thus estimated for each urgency class. This is made possible through the introduction of new field in all reservation messages [including request to send (RTS) and clear to send (CTS)] and headers of transmitted packets indicating the number of transmission attempts. FIG. 4 is a message format diagram of a message, such as a request to send (RTS) and clear to send (CTS), or a header of transmitted packet, indicating the number of transmission attempts. Congestion is estimated for each urgency class through the introduction of this message format.
5. The backoff counter would start to be decreased when the channel is idle for a time interval equal to the arbitration time corresponding to the urgency classification. The node would attempt transmission when the backoff counter expires.
6. Upon transmission failure, new backoff distribution parameters would be computed by decreasing the mean or by multiplying the contention window by the persistence factor for the urgency classification, and a new backoff counter value would be selected from the new distribution.
7. The backoff procedure is repeated until a specified packet delay is reached, which is urgency-class specific. Once this occurs, the packet transmission is cancelled.

Congestion-Adaptive, Traffic-Specific Backoff

Ideally one would want to start with a backoff counter appropriate for the traffic intensity at hand and retry upon failure with successively smaller backoff counters in order to increase the persistence of aging packets. Adaptation to traffic is desirable in order to avoid collision in congestion and reduce the idle time in low traffic intensity. Consistent with the notion that the Distributed Coordination Function could remain distributed, adaptation of the backoff distribution parameters (mean and variance) to traffic conditions will be performed in a decentralized manner, although centralized adaptation is equally feasible.

Adaptation of the backoff counter to traffic intensity is pursued in different time scales: (1) upon transmission of the packet; (2) upon transmission retrial; and (3) continuously (or whenever there is a change in traffic intensity exceeding a threshold value).

Upon arrival, or upon transmission retrial, if needed, a packet pending transmission draws a backoff counter value from a traffic-adapted backoff distribution. After every silent time slot, a packet's counter is decreased and transmission is attempted upon expiration of the counter, according to the conventional procedure. If the traffic intensity changes, the backoff counter is scaled up or down, depending on the direction of the traffic change, as follows.

If the traffic intensity increases, then the backoff counter is increased relative to its current value. A random increment is selected from a range (0, R), where R depends on the traffic intensity change; the increment is added to the current counter value. Countdown then proceeds as before. By drawing the increment randomly, variation is introduced to the new counter values of packets that had equal counter values previously (and heading for collision), thus helping avoid collision. This way, the relative order in which pending packets will transmit is preserved and preference for transmission is given to older packets.

If the traffic intensity decreases, decreasing the backoff counter values prevents long idle channel intervals. In order to preserve the relative time ordering of packets, a random decrement that is selected from a range (0, R), which depends on the traffic intensity change, is now subtracted from the current counter value.

By preserving the order in which pending packets will transmit, the age of a packet is respected by the backoff approach while at the same time allowing for quick adaptation to traffic variation. Thus it is more likely for older packets to seize the medium before newer ones, hence keeping the latency jitter low.

The nodes will estimate the traffic intensity from feedback information that includes: whether an attempted transmission succeeded or failed, the number of failed transmission attempts and the idle time spent waiting for transmission. For the latter, each node may include in the messages exchanged during reservation and/or in the packet headers the number of the retrial attempts and the time since arrival of the packet at the source node. The broadcast information will be class specific, from which class-specific traffic intensity estimates will be derived and class-specific backoff counter ranges shall be estimated.

When a node receives these messages, it will combine them with its own information to assess the level of congestion by the Traffic Intensity Estimation Procedure (TIEP) and select its initial backoff window accordingly. The adjustment of the backoff counter distribution parameters to traffic intensity shall be such that high congestion in an urgency class would increase the variance of the backoff-counter distribution, while higher intensity in classes of greater urgency would increase the mean of the backoff counter distribution.

The availability of class-specific traffic estimates will make it possible to start with a backoff counter appropriate for the traffic intensity at hand, and retry upon failure with properly adjusted and successively smaller backoff counters in order to increase the persistence of aging packets.

In the section that follows, we present "backoff scaling", a method for adjusting backoff window size and residual backoff delay based on observations on the success, failure, or idle status of a channel. We start by discussing the general case where no priorities are assigned to packets. We then give ways for dealing with prioritized traffic.

Backoff Scaling

Residual backoff and/or contention window adaptation can be done by 'backoff scaling'. This is a pseudo-Bayesian algorithm that relates to the a-priori distribution of the expected number p of nodes, with pending transmissions, and backoff value equal to 1. p is updated based on feedback from channel monitoring.

Ideally, one would want the estimated value of p to be 1. Nodes monitor the medium and detect collisions/success/idle. From these observations, an observed p value is computed. An observed p value greater than 1 suggests congestion. To reduce the new estimate of p to 1, the window size is increased by scaling up. Alternatively, if p is less than 1, one can scale down; the window size is reduced because the present window size is wider than required for the present traffic. The same scaling factor can be used to adjust residual backoff. FIG. 11 illustrates this concept; it shows the current and adjusted residual backoff values, respectively. When p=1.5, a node with residual backoff of 2 will scale up to assume a value of 2, 3, or 4 with given probabilities.

Upon arrival, or upon transmission retrial, of a packet pending transmission, a backoff counter value is drawn from a traffic-adapted backoff distribution. Following a silent time slot, a station's counter is decreased and transmission is attempted upon expiration of the counter, according to the conventional backoff procedure. In the proposed backoff procedure, if feedback is received at a given time slot concerning traffic intensity changes, the backoff counter is scaled up or down, depending on the direction of the traffic change. Feedback can be based on the number of idle time slots, the number of collisions, or other performance parameters such as latency and dropped packets. FIG. 5 illustrates this concept; m and m' stand for the current and adjusted backoff counter values, respectively. The proposed traffic-adaptation method preserves the ordering of backoff counter values, which implies some age ordering, thus retaining the lower latency jitter advantage of the backoff approach.

If the traffic intensity increases, the backoff counter is increased relative to its current value. A deterministic increment is added to the backoff counter value that is proportional to R, where R is a non-negative number that depends on the traffic intensity increase. A random increment is selected from a range (0, R), and that, too, is added to the current counter value. Countdown then proceeds as usual. This way, the relative order in which pending packets will transmit is preserved. By drawing the increment randomly, variation is introduced to the new counter values of packets that had equal counter values previously (and heading for collision), thus helping avoid collision.

If the traffic intensity decreases, decreasing the backoff counter values prevents long idle channel intervals. Again, in order to preserve the relative time ordering of packets, the current counter is scaled down by a factor D+1, where D would be a non-negative number that depends on the traffic intensity decrease.

Scaling can be applied also to the parameters of the random distribution (such as the offset and the contention window size) from which backoff values are drawn for new arrivals. The backoff offset and window size are adjusted by multiplying by the factor (R+1) when scaling up, and dividing by (D+1) when scaling down.

Residual Backoff Adjustment

To illustrate the scaling adjustment in more detail, consider a station i with a packet pending transmission that has a current backoff counter value $m_i$. It is assumed for now that the adjustment factors are integer; fractional adjustment factors are discussed in Appendix I. If many collisions occur, the adjustment factor R is estimated and used to increase the value of the backoff counter of station i to its new value $m_i'$ as follows:

$$m_i' = m_i \cdot (1+R) - R + x_i = m_i + (m_i - 1)R + x_i \quad (E1)$$

where $x_i$ is an integer for station i drawn randomly from the uniform distribution [0,R]. Because a station transmits when the backoff counter expires, stations engaged in backoff countdown have counter values $m_i \geq 1$; hence, the backoff counter will either increase or stay at its current value after the adjustment. FIG. 5 illustrates the possible values of $m_i'$ for $m_i=1,2,3$ and $R=1$.

If long idle intervals are observed on the channel, an adjustment factor D—which is also assumed for now to be an integer—will be estimated and used to decrease the value of the backoff counter of station i to its new value $m_i'$ as follows:

$$m_i' = trunc\left[\frac{m_i + D}{D+1}\right] \tag{E2}$$

The function trunc[.] is applied to obtain an integer counter by rounding down. FIG. 5 illustrates the possible values of $m_i'$ for $m_i=1, \ldots, 9$ and $D=2$.

By preserving the order in which pending packets will be transmitted, the age of a packet is respected by the backoff approach, while at the same time allowing for fast adaptation to traffic variation. Thus, the backoff approach retains the advantage of a lower latency jitter over the probability approach.

Backoff Distribution Parameter Adjustment

Scaling can be used for slow adaptation as well. The parameters of the random distribution (such as the offset and the contention window size) from which backoff values are drawn for new arrivals are adjusted in tandem with the residual backoff adjustment. It is assumed here, too, that the adjustment factors are integer; fractional adjustment factors are discussed in Appendix I.

If the backoff value is drawn from a uniform distribution with parameters [L,U], the distribution parameters after scaling up become: [L',U'], where $$L'=(R+1)\cdot L \text{ and} \tag{E3}$$

$$U'=(R+1)\cdot U \tag{E4}$$

When the parameters of the backoff distribution are expressed in terms of an offset L and a window of size $S=U-L+1$, the same scaling transformation is used. That is, $$S'=(R+1)\cdot S \tag{E5}$$

The distribution parameters after scaling down become the following:

$$L' = trunc\left[\frac{L+D}{D+1}\right] \tag{E6}$$

and $$U' = \max\left\{trunc\left[\frac{U+D}{D+1}\right], L'+1\right\} \tag{E7}$$

In computing U', one wants to ascertain typically that $L'\neq U'$ after scaling. The transformation for the window size is the following:

$$S' = \max\left\{trunc\left[\frac{S+D}{D+1}\right], 2\right\} \tag{E8}$$

Here again, one wants to ascertain typically that $S \geq 2$ after scaling. An algorithm for scaling is presented in Appendix II.

Adaptation Based on Contention Estimate

The backoff counter would be scaled up or down by estimating the expected number of backlogged stations having a backoff counter equal to 1, based on the observed outcome. When that number gets too large, the backoff counter is scaled up; when it gets too small, it is scaled down.

The expected number $b_1$ of backlogged stations with a backoff equal to 1 is the product of the expected number n of backlogged stations times the probability $p_1$ of having a backoff counter equal to 1. That is, $b_1=n\cdot p_1$. Expansion or compression of the backoff counter changes the estimate of $p_1$ as follows. When the backoff counter is scaled up by an adjustment factor R, $p_1$ decreases as follows:

$$p_1' = \frac{p_1}{R+1} \tag{E9}$$

When the backoff counter is scaled down by an adjustment factor D, $p_1$ increases as follows:

$$p_1'=(D+1)\cdot p_1 \tag{E10}$$

When scaling down the minimum backoff value for a backlogged terminal is 1, which is equivalent to saying that the maximum $p_1$ value is also 1. Typically one would want the size of the backoff window to be at least 2, which implies the following:

$$p_1 \leq 1/2 \tag{E1}$$

Adaptation Criteria

Ideally, we would like the expected number of backlogged stations with a backoff counter of 1 to be equal to 1. That is, we want $$b=n\cdot p_1=1 \tag{E12}$$

This ideal of making $p_1$ equal to 1/n is pursued through scaling the backoff counter values up or down when the value of b is greater or smaller than 1, respectively. That is, if $b_1=n_1\cdot p_1$ is observed currently, the probability is adjusted through scaling to achieve the ideal condition given in (E12) by dividing $p_1$ by $b_1$, as follows:

$$p_1' = \frac{p_1}{b_1} = \frac{p_1}{n_1 \cdot p_1} = \frac{1}{n1} \tag{E13}$$

The adjustment factors would be related to $b_1$ as follows: $R=b_1-1$ when scaling up, and $$D = \frac{1}{b_1} - 1$$

1 when scaling down. If the adjustment factors R and D are integer, equations (E1) through (E10) are employed. We explain in Appendix I how to adjust backoff values using fractional adjustment factors.

Of the various scaling algorithms that can be devised based on these concepts, we explore one that scales at fixed step sizes, which are timed based on the current estimate of the number of backlogged terminals with backoff value equal to 1. Two equivalent approaches are presented here.

Suppose that the adjustment factor in each direction is specified and is equal to ST; that is, R=ST and D=ST. There is a threshold value for $b_1$ or, equivalently, for $n_1$ that would trigger the desired adjustment. The threshold value is computed as follows. Whenever $b_1=n_1\cdot p_1>1$, we must ascertain that scaling up would not cause a change in the opposite direction; $b_1$ or $n_1$ must be sufficiently large that the same inequality will still hold after the desired adjustment. Hence, the requirement for scaling up by an adjustment factor R=ST is that the following holds:

$b_1 \geq ST+1 = C_R$, or equivalently $$n_1 \geq \frac{ST+1}{p_1} = n_R \quad (E14)$$

For any scaling down to be permitted if the new backoff window size must be at least 2, (see requirement in (8')), the values of $b_1$ or $n_1$ are constrained from above. That is, $b_1 \geq 2 \cdot p_1$, or equivalently $$n_1 \geq 2. \quad (E15)$$

A down scaling adjustment of D=ST is triggered when $b_1 = n_1 \cdot p_1 < 1$, when $b_1$ or $n_1$ are sufficiently small that the same inequality will still hold after the desired adjustment. The requirement for scaling up by an adjustment factor R=ST is thus the following:

$$b_1 \leq \frac{1}{ST+1} = C_D, \quad (E16)$$

or equivalently $$n_1 \leq \frac{1}{(ST+1) \cdot p_1} = n_D$$

If we expect that traffic fluctuation is rapid, then the integer-valued adjustment factors R and D that we have assumed so far in this section will be adequate to enhance channel utilization efficiency. Otherwise fractional adjustment factors need to be applied. We address in Appendix I the use of fractional adjustment factors, which would be used for more responsive adaptation.

Two examples of the basic backoff adaptation algorithm are presented in Appendix II.

The discussion that follows deals with the estimation procedure for $n_1$ (or equivalently, for $b_1$) used in the conditions presented above.

Pseudo-Bayesian Stabilization

To estimate the expected number of backlogged stations (or the expected number of backlogged stations with a backoff counter of 1), we use the feedback obtained by a station monitoring the channel, which consists of whether there was an idle, success, or collision observed. During a "channel idle" interval, a station is either counting down its backoff—hence, the interval is known as "backoff countdown"—or has no packets pending transmission—"station idle" interval. When the channel is busy, the station defers access—hence, we call that the "deferred access" interval. At the completion of the deferred access interval, the station has feedback as to whether the transmission was successful or not. An unsuccessful transmission on a perfect transmission medium is due to a collision, but on a channel with interference (such as a wireless channel), it could be due either to collision or to interference. For simplicity, let us assume for now that the channel is perfect, and that the collision involves two simultaneous transmissions.

Key to this computation is the estimation of the expected number n of backlogged stations, which can be computed from an estimate of the traffic arrival rate λ and the channel-monitoring outcome. The former is based on the rate of successful transmissions observed. Variable arrival rates are estimated from the most recent successful transmissions observed in a specified window of size N. The time elapsed for the last N successful transmissions can provide an estimate of the arrival rate λ.

$$\lambda = \frac{N}{(T_0 - T_N)} \quad (E17)$$

Given an estimate of λ, the expected number n of backlogged stations is updated at every state. The system transitions into a new state when one of the following outcomes is observed: idle, success, or failure. If $n_0$ is the number of backlogged terminals at the time of the previous observation (i.e. success, or failure), then the current number $n_1$ of backlogged terminals is given by relations based on concepts of the pseudo-Bayesian stabilization model presented in (2, Section 4.4.2). According to that model, if $\hat{n}_0$ is the estimate of the expected number of backlogged terminals at the time of the previous observation, then the current estimate of the number $\hat{n}_1$ of backlogged terminals is given by the following relations:

$$\hat{n}_1 = \hat{n}_0 \cdot q + \lambda \cdot \beta \text{ for idle time slot} \quad (E18)$$

$$\hat{n}_1 = \hat{n}_0 \cdot q + \lambda \cdot (\pi + \beta) \text{ for success} \quad (E19)$$

$$\hat{n}_1 = \hat{n}_0 + 2 + \lambda \cdot (\pi + \beta) \text{ for failure} \quad (E20)$$

where β is the slot time, π is the length of the transmitted packet, and $q = 1 - p_1$.

With an imperfect channel, an unsuccessful transmission would return one terminal to the pool of backlogged terminals if the transmission failure is due to interference; and n>1, if n packets were involved in the collision. A way to address the ambiguity on the nature of the cause of the transmission failure is to use the expected number r of the terminals that would be returned to the backlogged pool, where $1 \leq r$ and typically $r \leq 2$. Hence, (E20) can be written as follows:

$$\hat{n}_1 = \hat{n}_0 + r + \lambda \cdot (\pi + \beta) \text{ for failure} \quad (E21)$$

The current estimate of the expected number of backlogged terminals with backoff value of 1, $\hat{b}_1$, is simply the product $\hat{n}_1 \cdot p_1$. So, given the estimate $\hat{b}_0$ of the same variable at the time of the previous observation, $\hat{b}_1$ is given by (E18), (E19) and (E21) by simply multiplying through by $p_1$, which is also estimated in tandem as discussed above. That is, $$\hat{b}_1 = \hat{b}_0 + q + p_1 \cdot \lambda \cdot \beta \text{ for idle time slot} \quad (E22)$$

$$\hat{b}_1 = \hat{b}_0 + q + p_1 \cdot \lambda \cdot (\pi + \beta) \text{ for success} \quad (E23)$$

$$\hat{b}_1 = \hat{b}_0 + r + p_1 \cdot \lambda \cdot (\pi + \beta) \text{ for failure} \quad (E24)$$

Accommodation for 802.11 Features

The stabilization model described above accounts for the channel time spent in backoff countdown and in the contention-based transmission (CBT) following the completion of such countdown. Contention-based transmissions are all transmissions in the Contention Period that are not protected by a NAV. An observed successful transmission is any CBT that is received with a good CRC. CBTs with bad CRCs are also classified as successful if they are followed after a SIFS period by an ACK or CTS that is received with a good CRC. An RTS request or a data packet transmitted without RTS are considered CBTs.

Success or failure of a CBT transmission provides information useful to the estimation of the level of contention. The time on an 802.11 channel, however, is shared by other activities as well. These include non-contention-based transmissions (NCBT) following a reservation made by a successful RTS request; the transmissions that follow the reservation request; contention-free use of the channel by PCF; and the interframe spaces like SIFS, PIFS, DIFS, and EIFS used to mark the various activities. It is important to account for the time between the completion of the contention-based transmission (which follows backoff countdown) and the start of the new backoff countdown session, as new packet arrivals during this time will increase the number of backlogged terminals engaged in contention. We modify the above stabilization model in order to account for these arrivals.

To accommodate these special features of 802.11, the notion of the deferred-access interval is expanded to include the following: CBT, non-CBT, SIFS, ACK, ACKTimeout, EIFS and DIFS. FIGS. 6 through 8 illustrate how the deferred-access interval is specified. For example, in FIG. 6, the deferred-access interval for a transmitting station consists of the sum $\delta=\pi+w$, where $\pi$ is the effective length of a contention-based transmission, and w is the channel time devoted to arbitration and non-contention-based transmissions, all normalized by the packetlength and the channelrate.

The start of CBT is designated as $T_\delta$ and its end as $T_0$. $T_0$ occurs at the following events:

When a station transmits a data packet, $T_0$ is recorded upon receipt of an acknowledgement (ACK) or upon expiration of a timer set equal to ACKTimeout (the sum of the duration of an acknowledgement plus the SIFS plus the air propagation time), whichever occurs first.

When a station transmits an RTS, $T_0$ is recorded upon receipt of a CTS or upon expiration of a timer set equal to CTSTimeout (the sum of the duration of a CTS plus the SIFS plus the air propagation time), whichever occurs first.

When a station receives a data packet, $T_0$ is recorded at the end of the busy channel time if the packet is received correctly. Otherwise, $T_0$ is recorded upon receipt of an acknowledgment (ACK), or upon expiration of a timer set equal to EIFS following the end of the busy channel time.

When a station receives an RTS, CTS, data packet, or ACK, $T_0$ is recorded at the at the time indicated by the NAV.

The time upon expiration of an idle time of length equal to DIFS following the end of a CBT, $T_0$, is designated as $T_{AT}$. A CBT starts when the channel becomes busy for the first time after $T_{AT}$, which gives $T_\delta$. The interval $\pi$ is computed as follows:

$$\pi = T_0 - T_\delta \quad (E25)$$

The interval w starts at $T_0$ and ends at $T_{AT}$. The interval w is computed as follows:

$$w = T_{AT} - T_0 \quad (E26)$$

The current number $\hat{n}_1$ of backlogged terminals present after the time interval W is given by the following expression:

$$\hat{n}_1 = \hat{n}_0 + \lambda \cdot w \text{ or, equivalently}$$

$$\hat{b}_1 = \hat{b}_0 + p_1 \cdot \lambda \cdot w \text{ for the time interval following idle of length DIFS} \quad (E27)$$

It should be noted that, because the rate of change of the expected number of backlogged stations is the same throughout the deferred-access interval, the precise designation of $T_0$ is not critical. As along as it occurs between $T_\pi$ and $T_{AT}$, the result will be the same. If the duration of the deferred-access interval is denoted as $\delta$, that is, if $$\delta = \pi + w$$

then the current estimate of the number $\hat{n}_1$ of backlogged terminals is given by the following relations:

$$\hat{n}_1 = \hat{n}_0 \cdot q + \lambda \cdot \beta \text{ for idle time slot} \quad (E28)$$

$$\hat{n}_1 = \hat{n}_0 \cdot q + \lambda \cdot (\delta + \beta) \text{ for success} \quad (E29)$$

$$\hat{n}_1 = \hat{n}_0 \cdot r + \lambda \cdot (\delta + \beta) \text{ for failure} \quad (E30)$$

The estimate of the traffic arrival rate $\lambda$ is derived from the number of observed successful CBTs. Because of intervening CFP periods, updating of $\lambda$ is suspended until N successful CBTs have been received after the end of the CFP and, until then, the last-computed $\lambda$ value is used. The interval $T_0-T_N$ is reset at the end of each CFP.

Illustrative Implementations

Various implementations of this model are possible; we discuss two examples below. A variable $n_0$ representing an estimate of the number of backlogged stations is updated at discrete times. The value of $n_0$ is used to decide if a scale-up or scale-down is necessary. Different implementations of the adaptation procedure differ with respect to when the update occurs and when $n_0$ is checked in order to perform scaling. The first implementation follows the state transition updates as described above, estimating the expected number of backlogged terminals after an idle time slot, after a CBT, and upon expiration of an idle time interval equal to DIFS. In what we call the alternative implementation, estimation occurs during the idle time following time $T_{AT}$—the expiration of the idle time interval equal to DIFS, and upon occurrence of the next time $T_{AT}$. The advantages of each method will depend on the computation time constraints, which vary with the processor that will be used. The implementation logic for the two approaches is presented below.

Scaling adjustments are made at discrete step sizes of the adjustment factors, triggered when the expected number of backlogged terminals reaches a certain value or, equivalently, when the expected number of backlogged terminals with backoff value of 1 reaches a certain value. Multiple allowable step sizes can be selected for the adjustment factors. The check whether the specified threshold has been reached—referred to below as the Scaling Check—can occur as often as every update of the expected number of backlogged terminals, but less frequent checking would provide an implementation with lower computational load.

Each node maintains an estimate of the probability $p_1$, which they shall update following each scaling adjustment. When scaling up, it updates $p_1$ by dividing by the factor $C_R$. When scaling down, it updates $p_1$ by dividing by the factor $C_D$.

A node maintains an estimate of the traffic arrival rate $\lambda$, which is derived from the time $T_0-T_N$ elapsed for the last N successful CBTs successful transmissions. When a CFP occurs, update of $\lambda$ is suspended until N successful CBTs have been received after the end of the CFP and, until then, the last $\lambda$ value shall be used. The interval $T_0-T_N$ is reset at the end of each CFP.

A variable $n_0$ representing an estimate of the number of backlogged stations is updated at discrete times. The value of $n_0$ is used to decide if a scale-up or scale-down is necessary. Using the procedure described below, $n_0$ is adjusted no later than time $T_{AT}$, based on information obtained on the previous times $T_\delta$ and $T_{AT}$. $T_{AT}$ marks the end of an idle time interval of length DIFS following an EIFS, an ACK or CTS timeout, or when both CCA and the NAV indicate the medium is idle. $T_\delta$ is defined as the time when CCA indicates that the medium is busy for the following idle period started at time $T_{AT}$. $n_0$ is updated for every idle backoff slot time. In the Direct implementation, this adjustment is made at the end of every backoff slot using the equation $$n_1 = n_0 \cdot q + \lambda \cdot \beta \quad \text{(E31)}$$

where $q = 1 - p_1$ and $\beta$ is the slot time.

In the Alternative Implementation, one cumulative adjustment is made at any time up to the next $T_{AT}$ time by determining the number t of idle slots preceding the current CBT at time $T_\delta$ as follows:

$$t = \frac{T_\delta - T_{AT}}{\beta} \quad \text{(E32)}$$

The value of $n_0$ is updated by repeating the following equation t times:

$$n_0 = n_1; \text{ and } n_1 = n_0 \cdot q + \lambda \cdot \beta$$

The interval $\delta$ is calculated, in order to adjust the value of $n_0$, as follows:

$$\delta = T_{AT} - T_\delta \quad \text{(E33)}$$

At any time after an observed successful CBT, up to the next $T_{AT}$ time, $n_0$ is updated based on the following equation:

$$n_1 = n_0 q + \lambda \cdot (\delta + \beta) \text{ for success} \quad \text{(E34)}$$

At any time after an observed failed CBT, up to the next $T_{AT}$ time, $n_0$ is updated based on the following equation:

$$n_1 = n_0 + 2 + \lambda \cdot (\delta + \beta) \text{ for failure} \quad \text{(E35)}$$

Each time the variable $n_1$ is updated, $n_0$ is set equal to $n_1$.

As described above, scaling up occurs when $n_1 \cdot p_1 \geq C_R$, while scaling down occurs when $2 \leq n_1$ and $n_1 \cdot p_1 \leq C_D$.

The logic for the algorithms presented above appears on Appendix II. The threshold checks in the these involve the number of backlogged terminals. Equivalent algorithms can be derived by using the number of backlogged terminals with backoff value of 1.

Implementation Issues

In order to accommodate a variety of design considerations, we have presented above two different implementations of a model that computes adjustment factors for fast backoff adaptation in response to feedback on the success or failure of transmissions. In both implementations, the expected number of backlogged stations is estimated and compared to specified threshold values that trigger scaling.

The advantages of each method will depend on the computation time and power constraints, which vary with the processor that will be used. In the alternative implementation, the update of the expected number of backlogged stations and its comparison for scaling action occur only at the end of each channel-busy period, leading also to lower overall computation requirements. In the direct implementation several simpler computations occur intermittently at various times between completion of two consecutive busy intervals. Finally, the second example of the Alternative Implementation combines the advantages of both.

The backoff distribution parameters and residual backoff counters can be scaled either by an integer or a fractional adjustment factor, the granularity of the adjustment factors being chosen to best match traffic fluctuation. The computations for either type of factor consist primarily of additions and multiplications or divisions by integers. The integer random numbers employed when scaling up need not be truly random; a random sequence of integers—different for each terminal—can be stored in an array and cycled over repeatedly. The arithmetic involving random numbers less than 1, which occurs when scaling by fractional adjustment factors, can be carried out with integer random numbers, which are stored and retrieved similarly.

Priority-Class Differentiation

When differentiation between traffic classes is achieved through the use of urgency arbitration times (UATs) of different length, the deferred-access interval remains the same for all classes; that is, it ends when an idle time equal to DIFS is observed.

To meet different QoS requirements, stations generating different traffic streams with different transmission priorities may use different values for the adjustment factors R and D for the same traffic intensity, depending on these priorities. The factor values would be selected to reflect both the traffic intensity and the transmission priority of the traffic stream. Traffic loads can be estimated by priority class either by an access port, which would transmit this information periodically, or by each backlogged station, which would read the packet header containing a field that indicates the class of the transmitted packet.

A multitude of class-specific adjustment factors can be derived given a system-wide adjustment factor.

Of the many options, one must select the one that best serves QoS objectives. Different rules are employed for deriving class-specific expansion and compression factors, which are consistent with the backoff counter distributions expected as a result of employing tiered contention.

Class-Specific Expansion Factors

System-wide adjustment factors are computed using the procedure described above based on the channel monitoring outcome, that is whether the channel is idle or whether a successful transmission or failure has occurred. Class-specific adjustment factors are derived from a system-wide factor, given the breakdown of the traffic load by priority class, as follows.

Suppose that the backoff counter values are scaled up, due to congestion conditions when transmission failures would be observed. Let R be the factor by which backoff counter values must be scaled up; let $p_1$ be the probability computed by the adjustment algorithm above; and let $\lambda_i$ be the traffic load of priority i, where $$\sum_i \lambda_i = \lambda,$$

the total load. The class-specific adjustment factors $R_i$ are related to R as follows:

$$\sum_i \lambda_i \frac{p_1^i}{R_i + 1} = \lambda \frac{p_1}{R + 1} \quad \text{(E36)}$$

where $p_1^i$ is the proportion of backlogged stations with traffic in class i that have residual backoff counter equal to 1. These proportions must satisfy the following relation after each scaling adjustment:

$$\sum_i \lambda_i p_1^i = \lambda p_1 \tag{E37}$$

Tiered contention favors high priority packets by postponing countdown of lower priority packets in congestion conditions. We would like to preserve this bias after scaling up. Hence, while the backoff counters of the higher priority traffic are scaled up by the estimated system-wide expansion factor R, lower priority backoff counters could be scaled up more aggressively in order to avoid contention between them and the higher priority traffic. An approximate solution is obtained by scaling up the backoff counters of the least priority traffic [i=P] by a larger factor, while setting the top priority traffic [i=1] expansion factor $R_i$=R. Though this approach may lead to over-expansion of the low priority backoff counters, they will be eventually scaled down in lower traffic conditions.

Class-Specific Compression Factors

Let D be the system-wide factor by which backoff counters must be scaled down. The class-specific compression factors $D_i$ are related to D as follows:

$$\sum_i \lambda_i p_1^i(D_i + 1) = \lambda p_1(D + 1) \tag{E38}$$

Backoff counter values are typically scaled down when observing consecutive idle time slots. Since tiered contention is designed to allow traffic of different classes to seize the channel with comparable ease in such a situation, the distribution of backlogged stations with backoff counter of 1 should not be biased in favor of a particular class. Hence, the same compression factor is applied to all priority classes. That is, $$D_i = D \text{ for all } i \tag{E39}$$

The above choice of Class-specific compression factors $D_i$ meets the requirement in (E37).

Control Architecture

The proposed adaptation scheme can be carried out either in a centralized or distributed architecture. That is, channel monitoring will be carried out and the adaptation computations for scaling of either the residual backoff counters of backlogged stations or the parameters of the distributions from which new backoff values will be drawn can be performed by either the access port or by all the stations and the access port together. While channel monitoring and scaling computations may be distributed, centralized control is used to coordinate scaling in a BSS. The access port engages in fast adaptation continually and sends the required parameters and scaling commands to its associated stations continually.

With distributed control, fast adaptation may occur either continually if the station stays powered or only during backoff countdown, while the station is powered and monitoring the channel. A station that has been powered off can obtain updated backoff distribution and scaling information from active stations that are engaged in countdown or from the access port, if present. Messages containing this information would be sent by the access port to the stations regularly. Sharing of information on scaling is achieved in an ad hoc network provided that such information is included in a special message. We refer to this information as the adaptation data. When a previously idled station powers on, it reads this header and is thus able to engage in adaptation with parameters reflecting the current conditions. If a considerable time interval of channel inactivity elapses, these parameters would be restored to the original default values.

The adaptation data broadcast under distributed control enables an idle station to resume the adaptation calculations when it resumes countdown upon arrival of a new packet for transmission. Hence, the information included in the broadcast information is the following: the estimated number $n_1$ of backlogged stations, the probability $p_1$ that the backoff value is equal to 1, and the estimated packet arrival rate $\lambda$. This information is used to estimate a new value for $n_1$ as it monitors the channel during backoff countdown. In addition, the broadcast information must also provide the past scaling history. This history may be summarized in terms of the size of the scaled backoff distribution parameters. However, when QoS-differentiated backoff-distribution parameters are employed, the backoff distribution parameters will vary partly because of the priority class of the transmitted packet. In such a case, a composite scaling factor, CSF, is maintained to summarize the scaling activity resulting from consecutive multiplications and divisions by the scaling factors (R+1) and (D+1), respectively. That is, the new value of the composite scaling factor CSF' becomes:

$$CSF' = CSF \cdot (R + 1) \text{ following backoff expansion} \tag{E40}$$

$$CSF' = \frac{CSF}{D+1} \text{ following backoff compression} \tag{E41}$$

Given this information, the current distribution parameters [L',U'] for a packet of priority class i is obtained by multiplying the initial range [$L_i,U_i$] of the uniform backoff distribution for that class by the broadcast CSF value. That is, $$L' = \text{trunc}[CSF \cdot L_i + 0.5] \tag{E42}$$

$$U' = \text{trunc}[CSF \cdot U_i + 0.5] \tag{E43}$$

The scaling factors, and the backoff values and backoff distribution parameters obtained thereof, will depend on the channel activity heard by a node (station or access port) performing the adaptation. In general, larger backoff values will result from centralized adaptation because the access port hears all the channel activity in a BSS, while stations separated by a distance or other obstructions will not hear one another. However, stations situated in the overlapping coverage area of two or more access ports, or more generally stations in the periphery of a BSS in a multi-BSS system, may hear more channel activity and/or more transmission failures than stations closer to the access port or the access port itself; the former stations will select larger backoff values as a result.

When backoff adaptation performed by communicating nodes leads to asymmetric results—i.e., backoff values of different magnitudes—because different nodes hear different transmissions, the result is access failure, as a node hearing less channel activity will attempt transmission with shorter backoff values, but the destination node will not receive that transmission because of collisions from hidden nodes. To prevent this from happening, nodes engaged in adaptation will incorporate adaptation data from other nodes and, if necessary, update their own adaptation data with the more conservative values; that is, the values leading to larger backoff values. This will increase the probability of successful access for all nodes.

Advantages of Distributed Adaptation

Distributed adaptation has the advantage that it enables monitoring of the channel to occur throughout the BSS and not just at a single point, the access port. This enables the system to derive adaptation data from all nodes and process this data and perform adaptation in a way that ensures that all nodes, including the nodes experiencing the greatest amount of traffic, will be accommodated. This is important in situations involving several contiguous BSSs as it can account for inter-BSS interference. A station situated in the overlapping coverage area of two or more access ports will perceive the channel activity affecting its transmissions more accurately than its associated access port. By using channel-activity feedback on transmissions both from its own and from the interfering access port, such a station will adapt its backoff values more conservatively. Broadcasting its adaptation data to the access ports will cause them to expand their backoff values, thus avoiding failures.

If there are no transmissions from an access port, greater spatial reuse of the channel can be achieved in peer-to-peer communications by the stations. Since distributed adaptation permits individual stations to adapt only to the channel activity they can hear, the backoff values they compute would be smaller. The access port listening to all the transmissions in the BSS would estimate larger backoff requirements; but if the access port is not transmitting or receiving data, it will not ask the stations to increase their backoff values after receiving the adaptation data broadcast by the stations. Peer-to-peer applications between physically separated stations can thus use the channel simultaneously.

If there are transmissions from or to the access port, on the other hand, it would indicate that larger backoff windows should be used, based on its own adaptation data. By opening up the backoff windows of the associated stations, the access port is not impeded from accessing the channel.

Finally, distributed control enables an IBSS system to adapt to traffic conditions (transmission success or failure) in the absence of an access port.

APPENDIX I

Fractional Adjustment Factors

In the discussion above, integer adjustment steps were considered only. To obtain more responsive adaptation, we would like to allow for fractional adjustment steps as well.

Residual Backoff Adjustment

Scaling residual backoff values with fractional adjustment factors produces non-integer values which, if simply rounded, will give rise to a new distribution of backoff values that is not uniform. This reduces the efficiency of backoff. The non-integer values obtained through multiplication by the scaling factor are thus rounded by probabilistic rules that ensure that the scaled residual backoff values are distributed uniformly. We illustrate this procedure with the following example.

Suppose that the adjustment step $ST_{up}$ of size ½ for scaling up and the adjustment step $ST_{down}$ of size ⅓ for scaling down have been selected. The following constants are then specified:

$$C_R = ST_{up} + 1 = 1\frac{1}{2}, \text{ and}$$

$$C_D = \frac{1}{ST_{down} + 1} = \frac{3}{4}$$

where, $C_R$ is the scale-up factor and $C_D$ is the scale-down factor.

When scaling up is indicated, new values of the residual backoff m is obtained by the following computations. Let $$E[m'] = e + f = C_R \cdot m$$

where m is the residual backoff value, e is the integer part and f is the fractional part of the product. f can be 0, or ½. Select a random number x from the range [0, 1].

If $f = 0$, $m' = e - 1$ when $x < \frac{1}{6}$, $m' = e$ when $\frac{1}{6} \leq x < \frac{5}{6}$, and $m' = e + 1$, otherwise.

If $f = \frac{1}{2}$, $m' = e$, when $x < \frac{1}{2}$, and $m' = e + 1$, otherwise.

When scaling down is indicated, new values of the residual backoff m are obtained by the following computations. Let $$E[m'] = e + f = C_D \cdot m$$

where m is the residual backoff value, e is the integer part and f is the fractional part of the product. f can be 0, ¼, ½ or ¾. Select a random number x [0, 1].

If $f = 0$, $m' = e$

If $f = \frac{1}{4}$, $m' = e$, when $x < \frac{5}{6}$, and $m' = e + 1$, otherwise.

If $f = \frac{1}{2}$, $m' = e$, when $x < \frac{1}{2}$, and $m' = e + 1$, otherwise.

If $f = \frac{3}{4}$, $m' = e$, when $x < \frac{1}{6}$, and $m' = e + 1$, otherwise.

Backoff Distribution Parameter Adjustment

The parameters of the random distribution (such as the offset and the contention window size) from which backoff values are drawn for new arrivals are adjusted in tandem with the residual backoff adjustment. If the backoff value is drawn from a uniform distribution with parameters [L,U], the distribution parameters after scaling up become: [L',U'], where $L'=\text{trunc}[C_R \cdot L]$ and $U'=\text{trunc}[C_R \cdot U+0.5]$ When the parameters of the backoff distribution are expressed in terms of an offset L and a window of size S=U−L+1, the same scaling transformation is used. That is, $S'=\text{trun}[C_R \cdot S+0.5]$ The distribution parameters after scaling down become the following:

$L'=\max\{\text{trunc}[C_D \cdot L],1\}$ and $U'=\max\{\text{trunc}[C_D \cdot (U+ST_{down})],L'+1\}$ In computing U', one wants to ascertain typically that L'≠U' after scaling. The transformation for the window size is the following:

$S'=\max\{\text{trunc}[C_D \cdot (S+ST_{down})],2\}$.

Here again, one wants to ascertain typically that $S \geq 2$ after scaling. A scaling algorithm for this example is given in Appendix II.

NUMERICAL EXAMPLE

Table 7 illustrates the mapping of old to new backoff counter values for different starting backoff counter values, given the scale-up step size $R=\frac{1}{2}$.

TABLE 7

Backoff expansion transformation for fractional adjustment factors

| XIX. $C_R$ | m | E[m'] | Prob | m' |
|---|---|---|---|---|
| 1.5 | 1 | 1.5 | ½ | 1 |
|  |  |  | ½ | 2 |
|  | 2 | 3.0 | ⅙ | 2 |
|  |  |  | ⅓ | 3 |
|  |  |  | ⅙ | 4 |
|  | 3 | 4.5 | ½ | 4 |
|  |  |  | ½ | 5 |
|  | 4 | 6.0 | ⅙ | 5 |
|  |  |  | ⅓ | 6 |
|  |  |  | ⅙ | 7 |
|  | 5 | 7.5 | ½ | 6 |
|  |  |  | ½ | 7 |
|  | 6 | 9.0 | ⅙ | 8 |
|  |  |  | ⅓ | 9 |
|  |  |  | ⅙ | 10 |
|  | 7 | 10.5 | ½ | 9 |
|  |  |  | ½ | 10 |
|  | 8 | 12.0 | ⅙ | 11 |
|  |  |  | ⅓ | 12 |
|  |  |  | ⅙ | 13 |
|  | 9 | 13.5 | ½ | 12 |
|  |  |  | ½ | 13 |
|  | 10 | 15.0 | ⅙ | 13 |
|  |  |  | ⅓ | 14 |
|  |  |  | ⅙ | 15 |

One can verify that the new backoff values m' generated above are uniformly distributed, given that the old backoff values m were also uniformly distributed. That is, each of the scaled values will occur with the same probability because it will be obtained from scaling an equal proportion of the existing residual backoff values in backlogged stations.

Only backoff values greater than 1 are scaled down. Table 8 illustrates the mapping of old to new backoff counter values for a scale-down step size $D=\frac{1}{3}$, for different starting backoff counter values.

TABLE 8

Backoff compression transformation for fractional adjustment factors

| XX. $C_D$ | m | E[m'] | Prob | m' |
|---|---|---|---|---|
| 0.75 | 2 | 1.50 | ½ | 1 |
|  |  |  | ½ | 2 |
|  | 3 | 2.25 | ⅚ | 2 |
|  |  |  | ⅙ | 3 |
|  | 4 | 3.00 | 1.0 | 3 |
|  | 5 | 3.75 | ⅙ | 3 |
|  |  |  | ⅚ | 4 |
|  | 6 | 4.50 | ½ | 4 |
|  |  |  | ½ | 5 |
|  | 7 | 5.25 | ⅚ | 5 |
|  |  |  | ⅙ | 6 |
|  | 8 | 6.00 | 1.0 | 6 |
|  | 9 | 6.75 | ⅙ | 6 |
|  |  |  | ⅚ | 7 |
|  | 10 | 7.50 | ½ | 7 |
|  |  |  | ½ | 8 |

APPENDIX II

Algorithms

Scaling Algorithms

The greater the adaptation frequency is, the more responsive the adaptation will be, leading to greater efficiency gains. On the other hand, one wants to avoid excessive computations. Scaling can occur at specified times or as triggered by special events. Alternatively, adjustments can be made in steps of specified size $ST_{up}$ and $ST_{down}$ for scaling up and down, respectively. The logic of the algorithm for transforming the residual backoff values and the backoff distribution parameters for a fixed scaling step is given below for an integer and fractional step size.

Scaling Algorithm Logic for Integer Step Size

Determine desired scaling step size ST and specify constants $$C_R = ST_{up} + 1, \text{ and}$$

$$C_D = \frac{1}{(ST_{down} + 1)}$$

Inputs: m=residual backoff value (L, U)=backoff parameters

[S=backoff window size]

Block A [Scaling Up]

Step 0 Draw an integer random number x from the range [0, ST].

Step 1 Compute the new residual backoff value m'

$$m'=m \cdot C_R - ST_{up} + x$$

Step 2 Compute the lower bound of the scaled backoff distribution L'

$$L'=C_R \cdot L$$

Step 3 Compute the upper bound of the scaled backoff distribution U'

$$U'=C_R \cdot U$$

[Step 4 Compute the size of the backoff window S'

$$S'=C_R \cdot S]$$

Step 4 End of Block A

Block B [Scaling Down]

Step 0 Compute the new residual backoff value m'

$$m'=\text{trunc}[(m+ST_{down}) \cdot C_D]$$

Step 1 Compute the lower bound of the scaled backoff distribution L'

$$L'=\text{trunc}[(L+ST_{down}) \cdot C_D]$$

Step 2 Compute the upper bound of the scaled backoff distribution U'

$$U'=\max\{\text{trunc}[(U+ST_{down}) \cdot C_D], L'+1\}$$

[Step 3 Compute the size of the backoff window S'

$$S'=\max\{\text{trunc}[(S+ST_{down}) \cdot S_D], 2\}]$$

Step 4 End of Block B

Scaling Algorithm Logic for fractional step sizes R=0.5, D=⅓

Specify constants $$C_R = R + 1,$$
$$C_D = \frac{1}{(D+1)}, \text{ and}$$

Inputs: m=residual backoff value
(L, U)=backoff parameters
[S=backoff window size]
Block A [Scaling Up]
Step 0 Compute the expected value of m' and determine its integer and fractional parts $$Em = m \cdot C_R = e\_integer + f\_fraction$$

Step 1 Draw a random number x from the range [0, 1].
Step 2 If f_fraction=0, go to Step 3; otherwise go to Step 6
Step 3 If $x \leq 1/6$, set m'=e_integer−1 and go to Step 8; otherwise go to Step 4
Step 4 If $1/6 < x \leq 5/6$, set m'=e_integer and go to Step 8; otherwise go to Step 5
Step 5 Set m'=e_integer+1 and go to Step 8.
Step 6 If f_fraction=0.5 and $x \leq 1/2$ set m'=e_integer and go to Step 8; otherwise go to Step 7.
Step 7 Set m'=e_integer+1 and go to Step 8
Step 8 Compute the lower bound of the scaled backoff distribution L'

$$L' = \text{trunc}[C_R \cdot L]$$

Step 9 Compute the upper bound of the scaled backoff distribution U'

$$U' = \text{trunc}[C_R \cdot U + 0.5]$$

[Step 10 Compute the size of the backoff window S'

$$S' = \text{trunc}[C_R \cdot S + 0.5]]$$

Step 11 End of Block A
Block B [Scaling Down]
Step 0 Compute the expected value of m' and determine its integer and fractional parts $$Em = m \cdot C_D = e\_integer + f\_fraction.$$

Step 1 Draw a random number x from the range [0, 1].
Step 2 If f_fraction=0, set m'=e_integer and go to Step 11; otherwise go to Step 3
Step 3 If f_fraction=0.25, go to Step 4; otherwise go to Step 6
Step 4 If $x \leq 0.5$, set m'=e_integer and go to Step 11; otherwise go to Step 5
Step 5 Set m'=e_integer+1 and go to Step 11
Step 6 If f_fraction=0.5, go to Step 7; otherwise go to Step 9
Step 7 If $x \leq 1/2$, set m'=e_integer and go to Step 11; otherwise go to Step 8.
Step 8 Set m'=e_integer+1 and go to Step 11
Step 9 If $x \leq 1/6$, set m'=e_integer and go to Step 11; otherwise go to Step 10
Step 10 Set m'=e_integer−1 and go to Step 11
Step 11 Compute the lower bound of the scaled backoff distribution L'

$$L' = \max\{\text{trunc}[C_D \cdot L], 1\}$$

Step 12 Compute the upper bound of the scaled backoff distribution U'

$$U' = \max\{\text{trunc}[C_D \cdot (U+D)], L'+1\}$$

[Step 13 Compute the size of the backoff window S'

$$S' = \max\{\text{trunc}[C_D \cdot (S+D)], 2\}]$$

Step 14 End of Block B
Basic Backoff Adaptation Algorithm

We present in this section two equivalent examples of the proposed algorithm for backoff adaptation: one using estimates of $b_1$ and another using estimates of $n_1$. In these examples we assume for simplicity that the adjustment step is the same in the two directions.

Example 1

Estimates $b_1$

Determine desired scaling step size ST and specify constants $$C_R = ST + 1, \text{ and}$$
$$C_D = \frac{1}{(ST+1)}$$

$n_{start}$=average·number·of·terminals $$p_{start} = \frac{1}{U+1};$$

where U is the upper bound on the starting backoff distribution $$b_{start} = n_{start} \cdot p_{start}$$

Algorithm Logic
Step 0 Initialize $n_0 = n_{start}$;

$p_1 = p_{start}$;

$b_0 = b_{start}$

Block A [Perform the Following Steps Repeatedly.]
Step 0 Estimate $b_1$, the number of backlogged stations with backoff value equal to 1, using feedback data and the Estimation Procedure[1].

[1] An Estimation Procedure is presented below.

Step 1 Invoke Block S [Scaling check]
Step 3 End of Block A
Block S [Scaling Check]
Step 0 Check whether scaling up is required; that is, if $b_1 \geq C_R$, go to Step 1; otherwise, go to Step 2.
Step 1 Invoke the Scaling Algorithm to scale up by the adjustment factor R=ST
update $p_1 \leftarrow p_1 \cdot C_D$;
set $b_0 = b_1$; and
go to Step 5.
Step 2 Check whether scaling down is required; that is, if $2 \cdot p_1 \leq b_1 \leq C_D$, go to Step 3; otherwise, go to Step 4.
Step 3 Invoke the Scaling Algorithm to scale down by the adjustment factor D=ST
update $p_1 \leftarrow p_1 \cdot C_R$;
set $b_0 = b_1$; and
go to Step 5.
Step 4 No scaling adjustment is made; go to Step 5
Step 5 End of Block S

Example 2

Estimates $n_1$

Determine desired scaling step size ST and specify constants $$C_R = ST + 1, \text{ and}$$

$$C_D = \frac{1}{(ST+1)}$$

$n_{start}$=average-number-of-terminals $$p_{start} = \frac{1}{U+1}$$

where U is the upper bound on the starting backoff distribution

Algorithm Logic
Step 0 Initialize $n_0 = n_{start}$;

$p_1 = p_{start}$;

Block A [Perform the Following Steps Repeatedly.]

Step 0 Estimate $n_1$, the number of backlogged stations with backoff value equal to 1, using feedback data and the Estimation Procedure[2].

[2] An Estimation Procedure is presented below.

Step 1 Invoke Block S [Scaling check]
    Step 2 End of Block A
    Block S [Scaling Check]
    Step 0 Check whether scaling up is required; that is, if $n_1 \cdot p_1 \geq C_R$, go to Step 1; otherwise, go to Step 2.
    Step 1 Invoke the Scaling Algorithm to scale up by the adjustment factor R=ST
    update $p_1 \leftarrow p_1 \cdot C_D$;
    set $n_0 = n_1$; and
    go to Step 5.
    Step 2 Check whether scaling down is required; that is, if $2 \leq n_1$ and $n_1 \cdot p_1 \leq C_D$, go to Step 3; otherwise, go to Step 4.
    Step 3 Invoke the Scaling Algorithm to scale down by the adjustment factor D=ST
    update $p_1 \leftarrow p_1 \cdot C_R$;
    set $n_0 = n_1$; and
    go to Step 5.
    Step 4 No scaling adjustment is made; go to Step 5
    Step 5 End of Block S
    Implementations of the Backoff Adaptation Algorithm
    Direct Implementation In this implementation, the expected number of backlogged terminals is updated after the expiration of an idle period equal to DIFS, an idle time slot, and a busy period. The feedback received upon expiration of a busy period is assumed to be whether the transmission resulted in a failure or in a successful transmission.

Example

Determine desired scaling step size ST and specify constants $$C_R = ST + 1, \text{ and}$$

$$C_D = \frac{1}{(ST+1)}$$

$n_{start}$=average-number-of-terminals $$p_{start} = \frac{1}{U+1};$$

where U is the upper bound on the starting backoff distribution $$T_{st} = \frac{-N}{aver \cdot input \cdot rate}$$

Algorithm Logic
Define $q = 1 - p_1$
Step 0 Initialize $n_0 = n_{start}$;

$p_1 = p_{start}$;

$T_\pi = 0$;

EAT=0;

$T_N = T_{st}$

[Steps 1 through 4 are repeated indefinitely.]

Step 1 Given the last $T_{AT}$ time and $n_0$, invoke Block A to estimate number of backlogged stations $n_i$ during the idle interval and invoke Block S to perform scaling if needed
    Step 2 Given $n_0$, invoke Block B following an idle slot to estimate number of backlogged stations $n_1$, and invoke Block S to perform scaling if needed
    Step 3 Given $n_0$, invoke Block C following a busy channel update $T_0$, estimate number of backlogged stations $n_1$, and invoke Block S to perform scaling if needed
    Step 4 Go to Step 1
    Block A [Determine $T_{AT}$ and the Duration w of Non-Contention Channel Activity.]
    Step 0 Record the time $T_{AT}$ at the end of an idle interval equal to the arbitration time DIFS and compute w.

$$w = T_{AT} - T_0$$

Step 1 Estimate the number of backlogged stations $n_1$ $$n_1 = n_0 + \frac{N}{T_0 - T_N} \cdot w$$

Step 2 End of Block A
    Block B [At the End of an Idle Slot Time, Perform the Following Steps.]

Step 0 If the channel is sensed idle for a time slot, set the estimated number of backlogged stations $$n_1 = n_0 \cdot q + \frac{N}{T_0 - T_N} \cdot \beta;$$

and go to Step 1

Step 1 End of Block B

Block C [At the End of a CBT Transmission, Perform the Following Steps.]

Step 0 Record the start $T_\pi$ and the end $T_0$ of the busy channel interval and determine $\pi$ $$\pi = T_0 - T_\pi$$

Step 1 If failure was detected, set the estimated number of backlogged stations $$n_1 = n_0 + r + \frac{N}{T_0 - T_N} \cdot (\pi + \beta); \text{ set } n_0 = n_1;$$

and go to Step 4

Step 2 If transmission is successful, update the packet inter-arrival rate by using a sliding window-of-N average. That is, if $T_i$ is the time of completion of the $i^{th}$ successful transmission counting backward from the last successful transmission, $T_i = T_{i-1}$ for i=N, ..., 2 [once N successful transmissions have been observed]; and Go to Step 3

Step 3 Set the estimated number of backlogged stations $$n_1 = n_0 \cdot q + \frac{N}{T_0 - T_N} \cdot (\pi + \beta);$$

set $n_0 = n_1$; and go to Step 4

Step 4 Invoke Block S [Scaling check]

Step 5 End of Block C

Block S [Scaling Check]

Step 0 Check whether scaling up is required; that is, if $n_1 \cdot p_1 \leq C_R$, go to Step 1; otherwise, go to Step 2.

Step 1 Invoke the Scaling Algorithm to scale up by the adjustment factor R=ST;

update $p_1 \leftarrow p_1 \cdot C_D$; and go to Step 5.

Step 2 Check whether scaling down is required; that is, if $2 \leq n_1$ and $n_1 \cdot p_1 \leq C_D$, go to Step 3; otherwise, go to Step 4.

Step 3 Invoke the Scaling Algorithm to scale down by the adjustment factor D=ST;

adjust $p_1 \leftarrow p_1 \cdot C_R$; and go to Step 5.

Step 4 No scaling adjustment is made; go to Step 5

Step 5 End of Block S

Alternative Implementation

A different implementation of the pseudo-Bayesian stabilization model presented updates the estimated number of backlogged stations only at the end of a busy period, with the two possible outcomes being either success or failure. This implementation tracks fewer events and updates the estimate of the expected number of backlogged stations after expiration of the combined deferred-access interval. Scaling is performed at most once per CBT. in several simple recursive computations similar to those used in the Direct Implementation.

The expected number $n_1$ of backlogged stations is updated between two consecutive instances of $T_{AT}$, $EAT_{-1}$ and $EAT_0$, in two steps as follows. Given the earlier $T_{AT}$ time, $EAT_{-1}$, and the start of a CBT, $T_\delta$ (which is also the start of deferred access), the number t of idle time slots is computed by (E32). $n_1$ is updated using equation (E28) t times, repeatedly. This value provides $n_0$ for the next update. Given the start of a CBT, $T_\delta$, and the later $T_{AT}$ time, $EAT_0$, the length of the deferred-access interval $\delta$ is determined as follows $$\delta = EAT_0 - T_\delta, \quad (E35)$$

and $n_1$ is updated using equations (E29) and (E30), depending on whether the transmission has been deemed a success or a failure. The example below employs a single scaling step ST, and the Scaling Check is performed once with each new $T_{AT}$. The presentation of this example makes explicit the arithmetic efficiency of the computations.

Example

Determine desired scaling step size ST and specify constants $$C_R = ST + 1, \text{ and}$$

$$C_D = \frac{1}{(ST+1)}$$

$n_{start}$ = average-number-of-terminals $$p_{start} = \frac{1}{U+1};$$

where U is the upper bound on the starting backoff distribution $$\Delta ES_{start} = \frac{N}{aver \cdot input \cdot rate}$$

$$constant1 = \frac{1}{\beta}$$

$\Delta n_{start} = \beta \cdot (aver \cdot input \cdot rate)$

Algorithm Logic

Define $q = 1 - p_1$

Step 0 Initialize $n_0 = n_{start}$;

$p_1 = p_{start}$;

$T_\pi = 0$;

$EAT_{-1} = 0$;

$\Delta ES = \Delta ES_{start}$ $\Delta n_{idle} = \Delta n_{start}$

[Steps 0 through 2 are repeated indefinitely.]

Step 0 Given $EAT_{-1}$ and $n_0$, invoke Block A to find the next occurrence of $T_{AT}$, $EAT_0$, and estimate number of backlogged stations $n_1$ at that time.

Step 1 Invoke Block S to perform scaling if needed

Step 2 Set $EAT_{-1} = EAT_0$; set $n_0 = n_1$; and go to Step 0

Block A [Estimate $n_1$ at the End of Deferred Access at $EAT_0$]

Step 0 Record the start $T_\pi$ of a busy interval and determine the number of idle time slots t elapsed since the last transmission; that is, $$t = (T_\delta - EAT_{-1}) \cdot \text{constant1}$$

Step 1 Estimate the number of backlogged stations $n_1$ by repeating t times the following computations:

$$n_0 = n_1; \text{ and } n_1 = n_0 q + \Delta n_{idle}$$

Step 2 Record the time $EAT_0$ at the end of an idle interval equal to the arbitration time DIFS and compute the increment $$\Delta n_1 = \frac{(EAT_0 - T_\delta + \beta) \cdot N}{\Delta ES}$$

Step 3 Set $n_0 = n_1$

Step 4 If failure was detected, update the estimated number of backlogged stations as follows $$n_1 = n_0 + r + \Delta n_1; \text{ set } n_0 = n_1; \text{ and go to Step 7}$$

Step 5 If transmission was successful, update the time between the last N successful transmissions. That is, if $ES_i$ is the $T_{AT}$ time following the completion of the $i^{th}$ successful transmission counting backward from the last successful transmission, update $ES_i = ES_{i-1}$ for i=N, ..., 2 [once N successful transmissions have been observed]; set $\Delta ES = ES_0 - ES_N$; compute the increment $$\Delta n_{idle} = \frac{\beta \cdot N}{\Delta ES};$$

and go to Step 6

Step 6 Set the estimated number of backlogged stations $$n_1 = n_0 q + \Delta n_1; \text{ set } n_0 = n_1; \text{ and go to Step 7}$$

Step 7 End of Block A

Block S [Scaling Check]

Step 0 Check whether scaling up is required; that is, if $n_1 \cdot p_1 \geq C_R$, go to Step 1; otherwise, go to Step 2.

Step 1 Invoke the Scaling Algorithm to scale up by the adjustment factor R=ST;

update $p_1 \leftarrow p_1 \cdot C_D$; and go to Step 5.

Step 2 Check whether scaling down is required; that is, if $2 \leq n_1$ and $n_1 \cdot p_1 \leq C_D$, go to Step 3; otherwise, go to Step 4.

Step 3 Invoke the Scaling Algorithm to scale down by the adjustment factor D=ST;

adjust $p_1 \leftarrow p_1 \cdot C_R$; and go to Step 5.

Step 4 No scaling adjustment is made; go to Step 5

Step 5 End of Block S w the time between the completion of the last contention-based transmission $x_i$ integer for station i drawn randomly from the uniform distribution [0, R]

What is claimed is:

1. A method for a distributed medium access protocol that schedules transmission of different types of packets on a channel based on a service quality specification for each type of packet, comprising:

determining at a plurality of nodes in a network, an urgency class for each of a plurality of pending packets according to a scheduling algorithm;

transmitting pending packets in a given urgency class before transmitting packets of a lower urgency class;

remembering a number of transmission attempts by a node for a last transmission of same node;

estimating from said number of transmission attempts a current congestion level that is experienced; and adjusting a backoff counter to the current congestion level to provide a dispersion of packet traffic bursts.

2. The method for a distributed medium access protocol of claim 1, which further comprises:

broadcasting with each transmission the number of transmission attempts by a node;

estimating from said number of transmission attempts received from other nodes the current congestion level that is experienced; and adjusting a backoff counter to the current congestion level to provide a dispersion of packet traffic bursts.

3. The method for a distributed medium access protocol of claim 1, which further comprises:

remembering the number of transmission attempts for packets of every urgency class by a node for the a last transmission in that class of same node;

estimating from said number of transmission attempts the current congestion that is experienced by the an urgency class of a pending packet; and adjusting a backoff counter for the pending packet to the current congestion level to provide a dispersion of packet traffic bursts.

4. The method for a distributed medium access protocol of claim 1, which further comprises:

broadcasting with each transmission the number of transmission attempts by a node and the assigned urgency class;

estimating from said number of transmission attempts received from other nodes the current congestion level that is experienced by an urgency class of a pending packet; and adjusting a backoff counter of the pending packet to the current congestion level to provide a dispersion of packet traffic bursts.

5. The method for a distributed medium access protocol of claim 1, which further comprises:

initializing backoff counters with a relatively longer value, and then decreasing the value upon transmission failure and retrial.

6. The method for a distributed medium access protocol of claim 1, which further comprises:

remembering the number of transmission attempts by a node for the last transmission of same node;

estimating from said number of transmission attempts the current congestion level that is experienced; and adjusting a persistence probability to current congestion level to provide a dispersion of packet traffic bursts.

7. The method for a distributed medium access protocol of claim 1, which further comprises:

broadcasting with each transmission the number of transmission attempts by a node;

estimating from said number of transmission attempts received from other nodes the current congestion level that is experienced; and adjusting a persistence probability to the current congestion level to provide a dispersion of packet traffic bursts.

8. The method for a distributed medium access protocol of claim 1, which further comprises:

remembering the number of transmission attempts for packets of every urgency class by a node for a last transmission in that class of same node;

estimating from said number of transmission attempts the current congestion level that is experienced by an urgency class of a pending packet; and adjusting a persistence probability for the pending packet to current congestion level to provide a dispersion of packet traffic bursts.

9. The method for a distributed medium access protocol of claim 1, which further comprises:

broadcasting with each transmission the number of transmission attempts by a node and the assigned urgency class;

estimating from said number of transmission attempts received from other nodes the current congestion level that is experienced by an urgency class of a pending packet; and adjusting a persistence probability of the pending packet to the current congestion level to provide a dispersion of packet traffic bursts.

10. The method for a distributed medium access protocol of claim 1, which further comprises:

initializing a persistence probability with a relatively lower value, and then increasing the value upon transmission failure and retrial.

11. The method for a distributed medium access protocol of claim 1, which further comprises:

establishing criteria for cancellation of transmission of a packet associated with packet delay.

12. The method for a distributed medium access protocol of claim 1, which further comprises:

applying backoff prior to attempting any transmission.

13. The method for a distributed medium access protocol of claim 1, which further comprises:

checking for permission to transmit by using a specified persistence probability prior to attempting any transmission.

14. The method for a distributed medium access protocol of claim 1, wherein said network is a wireless network.

15. The method for a distributed medium access protocol of claim 1, wherein said network is a cellular packet network.

16. The method for a distributed medium access protocol of claim 1, wherein said network comprises one or more multi-channel air interface systems in accordance with at least one of: Frequency Division Multiple Access (FDMA), Time Division Multiple Access (TDMA), Orthogonal Frequency Division Multiplexing (OFDM) or Code Division Multiple Access (CDMA).

* * * * *